United States Patent
Shibaike et al.

(10) Patent No.: US 12,177,835 B2
(45) Date of Patent: Dec. 24, 2024

(54) TERMINAL APPARATUS TO TRANSMIT HYBRID AUTOMATIC REPEAT REQUEST INFORMATION AND RELATED COMMUNICATION METHOD

(71) Applicant: Panasonic Intellectual Property Corporation of America, Torrance, CA (US)

(72) Inventors: Naoya Shibaike, Kanagawa (JP); Hidetoshi Suzuki, Kanagawa (JP); Tomoya Nunome, Ishikawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 434 days.

(21) Appl. No.: 17/440,714

(22) PCT Filed: Dec. 18, 2019

(86) PCT No.: PCT/JP2019/049539
§ 371 (c)(1),
(2) Date: Sep. 17, 2021

(87) PCT Pub. No.: WO2020/194923
PCT Pub. Date: Oct. 1, 2020

(65) Prior Publication Data
US 2022/0174705 A1 Jun. 2, 2022

(30) Foreign Application Priority Data
Mar. 26, 2019 (JP) ................. 2019-059206

(51) Int. Cl.
*H04W 72/04* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01); *H04W 72/23* (2023.01)

(58) Field of Classification Search
CPC .............. H04W 72/1273; H04W 72/23; H04L 1/1812; H04L 1/1854; H04L 1/1896;
(Continued)

(56) References Cited

U.S. PATENT DOCUMENTS

2016/0295561 A1* 10/2016 Papasakellariou .... H04W 72/23
2017/0207895 A1 7/2017 Yang et al.
(Continued)

FOREIGN PATENT DOCUMENTS

| WO | 2017/170814 A1 | 10/2017 |
|----|----------------|---------|
| WO | 2018128493 A1 | 7/2018 |
| WO | WO 2019033384 A1 | 2/2019 |

OTHER PUBLICATIONS

Extended European Search Report, dated Apr. 13, 2022, for European Application No. 19920717.6 - 1213, 9 pages.
(Continued)

*Primary Examiner* — Mahbubul Bar Chowdhury
(74) *Attorney, Agent, or Firm* — Seed IP Law Group LLP

(57) ABSTRACT

A terminal apparatus includes a receiver and a transmitter. The receiver receives, from a base station, a downlink assignment index (DAI) that is transmitted by means of a downlink control information (DCI) format. The DAI indicates an accumulative number of a transmitted physical downlink shared channel (PDSCH) included in a group of PDSCHs. A range of the accumulative number of which the DAI is indicative is variably configured. The transmitter, in operation, transmits, to the base station, hybrid automatic repeat request acknowledgement (HARQ-ACK) information based on the DAI.

5 Claims, 11 Drawing Sheets

| Bit value | The number of HARQ-ACKs that gNB/eNB want to trigger | The number of HARQ-ACKs that gNB/eNB actually trigger |
|-----------|------------------------------------------------------|-------------------------------------------------------|
| 00 | 0 | 0 |
| 01 | $\leq 2$ | 2 |
| 10 | $\leq 4$ | 4 |
| 11 | $\leq 6$ | 6 |

(51) Int. Cl.
*H04L 5/00* (2006.01)
*H04W 72/1273* (2023.01)
*H04W 72/23* (2023.01)

(58) Field of Classification Search
CPC ... H04L 1/1848; H04L 1/1858; H04L 5/0053; H04L 2001/125
See application file for complete search history.

(56) References Cited

U.S. PATENT DOCUMENTS

| | | | | |
|---|---|---|---|---|
| 2018/0241510 | A1* | 8/2018 | Shen | H04L 1/1621 |
| 2018/0332568 | A1* | 11/2018 | Wu | H04B 7/0697 |
| 2019/0116489 | A1 | 4/2019 | Harada et al. | |
| 2019/0230685 | A1 | 7/2019 | Park et al. | |
| 2020/0059327 | A1* | 2/2020 | Kini | H04W 72/23 |
| 2020/0127796 | A1* | 4/2020 | Li | H04L 1/1812 |
| 2020/0145138 | A1* | 5/2020 | Bhattad | H04L 1/1614 |
| 2020/0280396 | A1* | 9/2020 | Gao | H04L 1/1812 |
| 2021/0352704 | A1* | 11/2021 | Yang | H04L 1/1671 |
| 2022/0014314 | A1* | 1/2022 | Wang | H04W 72/1268 |
| 2022/0078827 | A1* | 3/2022 | Zhang | H04W 72/1273 |
| 2022/0353046 | A1* | 11/2022 | Matsumura | H04W 72/046 |
| 2022/0407631 | A1* | 12/2022 | El Hamss | H04L 1/1854 |

OTHER PUBLICATIONS

Samsung, "HARQ enhancements for NR-U," R1-1808770, Agenda item: 7.2.2.4.3, 3GPP TSG RAN WG1 Meeting #94, Gothenburg, Sweden, Aug. 20-24, 2018, 6 pages.
3GPP TS 38.214 V15.4.0, "3$^{rd}$ Generation Partnership Project; Technical Specification Group Radio Access Network; NR; Physical layer procedures for data (Release 15)," Dec. 2018, 102 pages.
ETSI EN 301 893 V2.1.1, "5 GHz RLAN; Harmonised Standard covering the essential requirements of article 3.2 of Directive 2014/53/EU" May 2017, 122 pages.
International Search Report, dated Oct. 1, 2020, for International Application No. PCT/JP2019/049539, 5 pages. (with English translation).
Extended European Search Report dated Dec. 6, 2023, for the corresponding European Patent Application No. 23175005.0, 8 pages.
MediaTek Inc., "Enhancements to HARQ for NR-U operation," R1-1901800, Agenda Item: 7.2.2.2.3, 3GPP TSG RAN WG1 #96, Athens, Greece, Feb. 25-Mar. 1, 2019, 13 pages.

* cited by examiner

| Bit value | The number of HARQ-ACKs that gNB/eNB want to trigger | The number of HARQ-ACKs that gNB/eNB actually trigger |
|---|---|---|
| 000 | $\leq 3$ | 3 |
| 001 | $\leq 6$ | 6 |
| 010 | $\leq 9$ | 9 |
| 011 | $\leq 12$ | 12 |
| 100 | $\leq 15$ | 15 |
| 101 | $\leq 18$ | 18 |
| 110 | $\leq 21$ | 21 |
| 111 | $\leq 24$ | 24 (Estimated as maximum value: $N_{CA} * N_{HARQ\,process}$) |

FIG. 6

| Bit value | The number of HARQ-ACKs that gNB/eNB want to trigger | The number of HARQ-ACKs that gNB/eNB actually trigger |
|---|---|---|
| 000 | 0 | 0 |
| 001 | 1 | 1 |
| 010 | 2 | 2 |
| 011 | 3 | 3 |
| 100 | 4 | 4 |
| 101 | 5 | 5 |
| 110 | 6 | 6 |
| 111 | $\leq 24$ | 24 (Estimated as maximum value: $N_{CA} * N_{HARQ\,process}$) |

FIG. 7

| Bit value | $V_{DAI}$ | The number of HARQ-ACK (Y) |
|---|---|---|
| 00 | 1 | 1, 5, 9, ... |
| 01 | 2 | 2, 6, 10, ... |
| 10 | 3 | 3, 7, 11, ... |
| 11 | 4 | 4, 8, 12, ... |

FIG. 10

| Bit value | $V_{DAI}$ | The number of HARQ-ACK (Y) |
|---|---|---|
| 00 | Not triggered | 0 |
| 01 | 1 or 2 | 1, 2, 5, 6, 9, 10, ... |
| 10 | 3 or 4 | 3, 4, 7, 8, 11, 12, ... |
| 11 | Not triggered | 0 |

FIG. 11

| UE #1 | UE #2 | UE #3 | UE #4 | | UE #N |
|---|---|---|---|---|---|
| 01 | 10 | 00 | 10 | | 11 |

FIG. 12

| Bit value | The number of HARQ-ACKs that gNB/eNB want to trigger | The number of HARQ-ACKs that gNB/eNB actually trigger |
|---|---|---|
| 00 | 0 | 0 |
| 01 | ≦ 2 | 2 |
| 10 | ≦ 4 | 4 |
| 11 | ≦ 6 | 6 |

FIG. 13

TERMINAL APPARATUS TO TRANSMIT HYBRID AUTOMATIC REPEAT REQUEST INFORMATION AND RELATED COMMUNICATION METHOD

TECHNICAL FIELD

The present disclosure relates to a base station, a terminal, and a communication method.

BACKGROUND ART

In the standardization of the 5th generation mobile communication system (5G), 3GPP has been discussing a new radio access technology (NR) that is not necessarily backward compatible with LTE/LTE-Advanced.

As with an LTE-License-Assisted Access (LTE-LAA), NR is expected to be operated in unlicensed bands (also referred to as NR-U and NR-based Access to Unlicensed Spectrum). LTE-LAA supports the operation in unlicensed bands accompanying the operation in licensed bands. NR, however, is required to realize the operation in unlicensed bands without using licensed bands (stand-alone operation).

In LTE, a terminal (may be referred to as User Equipment (UE)) determines whether a data signal (e.g., downlink data channel such as Physical Downlink Shared Channel (PDSCH)) transmitted from a base station (may be referred to as eNB) is successfully decoded (e.g., success or failure in decoding) after receiving the data signal. The terminal feeds back the determination result to the base station. The base station refers to the feedback information, and retransmits the data signal indicated as the failure in decoding to the terminal. This retransmission control operation is referred to as a Hybrid Automatically Repeat request (HARQ), and the feedback information (i.e., response signal) is referred to as ACK/NACK, HARQ-ACK, HARQ feedback, etc.

CITATION LIST

Non-Patent Literature

NPL 1
3GPP TS 38.214 V15.4.0, "NR; Physical layer procedures for data (Release 15)," December 2018
NPL 2
ETSI EN 301 893 V2.1.1, "5 GHz RLAN; Harmonised Standard covering the essential requirements of article 3.2 of Directive 2014/53/EU," May 2017

SUMMARY OF INVENTION

However, there is scope for further study on a retransmission control method in unlicensed bands.

One non-limiting and exemplary embodiment facilitates providing a base station, a terminal, and a communication method each capable of appropriately controlling retransmission in unlicensed bands.

A base station according to an embodiment of the present disclosure includes: a transmitter, which in operation, transmits control information on a request for retransmission of a response signal for downlink data; and a receiver, which in operation, receives the response signal retransmitted based on the control information, wherein the control information is information for identifying one of a plurality of candidate values for the number of a plurality of the response signals requested to be retransmitted, and the plurality of candidate values are configured based on one of a plurality of granularities.

It should be noted that general or specific embodiments may be implemented as a system, an apparatus, a method, an integrated circuit, a computer program, a storage medium, or any selective combination thereof.

According to an embodiment of the present disclosure, it is possible to appropriately control retransmission in unlicensed bands.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 6 illustrates exemplary associations between an indication bit and the number of HARQ-ACKs requested to be retransmitted according to Embodiment 1;

FIG. 7 illustrates other exemplary associations between the indication bit and the number of HARQ-ACKs requested to be retransmitted according to Embodiment 1;

FIG. 10 illustrates exemplary associations between an indication bit and the number of HARQ-ACKs requested to be retransmitted according to Embodiment 2;

FIG. 11 illustrates other exemplary associations between the indication bit and the number of HARQ-ACKs requested to be retransmitted according to Embodiment 2;

FIG. 12 illustrates an exemplary configuration of DCI according to Embodiment 3;

FIG. 13 illustrates exemplary associations between an indication bit and the number of HARQ-ACKs requested to be retransmitted according to Embodiment 3;

DESCRIPTION OF EMBODIMENTS

Figure 1:
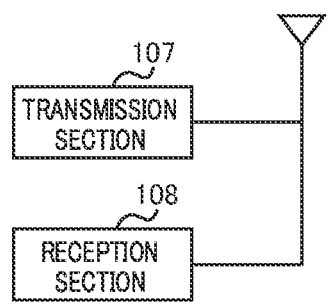
FIG. 1 is a block diagram illustrating an exemplary configuration of a part of a base station.

Hereinafter, embodiments of the present disclosure will be described in detail with reference to the accompanying drawings.

In terms of HARQ, for example, HARQ-ACK for PDSCH is scheduled after a specified number of slots from a slot where the PDSCH is transmitted, in Frequency Division Duplex (FDD). In Time Division Duplex (TDD), the timing of HARQ-ACK is determined according to a configuration specified for each DL/UL configuration, for example.

LTE-LAA supports the operation of retransmission control by HARQ. In HARQ in LTE-LAA, however, HARQ-ACK is transmitted by using a part of an uplink control channel (e.g., Physical Uplink Control Channel (PUCCH)) in a licensed band or an uplink data channel (e.g., Physical Uplink Shared Channel (PUSCH)) in a licensed band or an unlicensed band so as to avoid an effect of carrier sense (e.g., Listen Before Talk (LBT)) on transmission of HARQ-ACK from a terminal to a base station.

NR also supports the operation of retransmission control by HARQ in a licensed band (see, for example, Non Patent Literature (hereinafter referred to as NPL) 1). Unlike in LTE, a base station (may be referred to as gNB) can dynamically indicate, to a terminal, information on the timing of HARQ-ACK for PDSCH and a resource configuration as well as scheduling each PDSCH in NR.

Further, studies have been carried out for NR on supporting the operation of retransmission control by HARQ in the unlicensed band in addition to the licensed band. NR is required to realize the operation in the unlicensed band (stand-alone operation), and thus transmission of HARQ-ACK using the unlicensed band is discussed, unlike for LTE-LAA.

In the unlicensed band, however, the terminal determines whether transmission is possible according to a confirmation result of a bandwidth occupancy status by the carrier sense (e.g., LBT), for example, and the terminal cannot transmit HARQ-ACK depending on the determination result of the LBT in some cases.

Thus, there is scope for further study for NR how the base station requests the transmission of HARQ-ACK (i.e., retransmission of HARQ-ACK) that has not been transmitted at a timing assigned simultaneously with scheduling of PDSCH when there is a section in the unlicensed band where the terminal cannot transmit HARQ-ACK for PDSCH.

In NR, an uplink (UL) resource for the feedback, to the base station, whether the decoding of a data signal (e.g., PDSCH) is succeeded or failed (e.g., HARQ-ACK) in the terminal is indicated to the terminal as a "PUCCH resource indicator" by DCI for resource assignment for PDSCH, for example.

In terms of the resource for HARQ-ACK in a time direction, a plurality of candidates for a configuration value are configured for the terminal by higher layer signaling (e.g., Radio Resource Control (RRC)), for example, and an indication for selecting one of the plurality of candidates can be included as a "PDSCH-to-HARQ_feedback timing indicator" by the DCI for resource assignment for PDSCH, for example. In addition, a method using PUCCH or PUSCH, for example, is supported for the transmission of HARQ-ACK from the terminal to the base station.

When an apparatus detects another entity in a band where communication is to be performed in the unlicensed band, the communication in the band is generally prohibited (see, for example, NPL 2). Thus, LTE-LAA, for example, supports performing the carrier sense (e.g., LBT) prior to communication by each apparatus, and the implementation of LBT is also considered for the operation of NR in the unlicensed band (e.g., NR-U).

In LBT, each apparatus searches the unlicensed band targeted for signal transmission prior to the transmission at a timing before the signal transmission timing by a specific time, for example, and confirms whether another apparatus (e.g., a base station, a terminal, and a Wi-Fi (registered trademark) device) performs communication in the band. Each apparatus determines that the band is available for communication when confirming by LBT that no communication is performed by another apparatus, and determines that the band is unavailable for communication when not confirming that no communication is performed by another apparatus. In addition, the band that has been determined to be available by LBT is configured with a transmittable time called a "Channel Occupancy Time (COT)", and LBT is performed again for communication after the transmittable time has passed.

In NR, the resource for HARQ-ACK for PDSCH is assigned when the PDSCH resource is assigned, as described above. In the communication in the unlicensed band, however, HARQ-ACK is not transmitted unless it is confirmed that the band to be used is available as a result of LBT immediately before the communication. Further, in the communication in the unlicensed band, the communication duration is limited to the configured COT length or less, even for the band where the band to be used is confirmed to be available.

Thus, HARQ-ACK is not transmitted in some cases where the band to be used is not confirmed to be available by LBT in the HARQ-ACK resource assigned with the PDSCH assignment or where the HARQ-ACK resource is assigned outside a range of the configured COT.

In such a case, the operation of HARQ as in NR, for example, does not allow the terminal to retransmit HARQ-ACK, and the base station retransmits PDSCH because the determination whether the decoding of PDSCH is succeeded or failed is unknown. This reduces resource utilization efficiency when, for example, PDSCH is retransmitted from the base station due to a failure in HARQ-ACK transmission resulting from LBT even though the terminal has actually successfully decoded the PDSCH. Further, the transmission is restricted by LBT and COT in the unlicensed band as described above, and thus there is no guarantee when the PDSCH is retransmitted.

In NR, each of HARQ-ACKs for a plurality of PDSCHs is configured in the same resource, and the terminal can transmit a plurality of HARQ-ACKs using a single PUCCH. In this case, the base station and the terminal recognize the same number of HARQ-ACKs to be transmitted using PUCCH. In this regard, the base station indicates a counter/total Downlink Assignment Index (DAI) to the terminal by DCI corresponding to each PDSCH in NR. The counter DAI indicates, for example, a value on the accumulative number of PDSCHs transmitted to the terminal, and the total DAI indicates, for example, a value on the total number of PDSCHs transmitted to the terminal.

For example, the terminal can recognize the number of HARQ-ACKs to be transmitted (in other words, the number of PDSCHs to be received) in the HARQ-ACK resource (e.g., PUCCH resource) indicated from the base station, based on the value of the total DAI.

However, the counter/total DAI (hereinafter, may be simply referred to as DAI) indicates a value of a modulo operation result obtained by dividing the actual number of PDSCHs (e.g., the accumulative number or the total number) by 4. Thus, when the terminal consecutively fails to receive DCI four times or more, for example, the terminal may not correctly recognize the number of PDSCHs actually transmitted using the DAI received thereafter.

In addition, the terminal may not correctly recognize the number of PDSCHs actually transmitted using the received DAI when the terminal fails to receive DCI that indicates assignment of one or more PDSCHs assigned to the last slot among a plurality of PDSCHs, the HARQ-ACK resource for which is assigned to the same PUCCH.

The resource for PUCCH is determined depending on a payload size of transmission information including HARQ-ACK, for example. Thus, the base station and the terminal possibly have a difference in the recognition of the transmission resource for PUCCH used for HARQ-ACK when having a difference in the recognition of the number of HARQ-ACKs assigned to the same PUCCH. In this case, the base station possibly fails to receive PUCCH properly and fails to receive HARQ-ACK accordingly.

The above-described consecutive failures in receiving DCI or failure in receiving DCI assigned to the last slot at the terminal, which is one of the causes of the failure in receiving HARQ-ACK at the base station, possibly occurs in the unlicensed band more frequently than the licensed band, due to interference of another system, such as Wi-Fi.

In the HARQ-ACK resource assignment method supported in NR, a single HARQ-ACK resource is assigned to a single PDSCH as described above, and thus transmission opportunities for HARQ-ACK are not sufficiently guaranteed because of the transmission restriction by LBT and COT in the unlicensed band. Further, the consecutive failures in receiving DCI at the terminal, which is assumed to occur in the unlicensed band more frequently than the licensed band, possibly cause the difference in the recognition of the number of HARQ-ACKs between the base station and the terminal, and result in the failure in receiving PUCCH at the base station.

With this regard, a description will be given in an embodiment of the present disclosure, of a case where the base station requests (i.e., triggers) the terminal to retransmit HARQ-ACK when the HARQ-ACK to which the resource has been assigned is not received at the base station, for example, considering that the transmission failure of HARQ-ACK is more likely to occur in the unlicensed band than the license band due to the effect of the transmission restriction by LBT and COT. An embodiment of the present disclosure also describes a method of retransmitting HARQ-ACK in the operation in the unlicensed band.

Embodiment 1

[Overview of Communication System]

A communication system according to the present embodiment includes base station 100 and terminal 200.

FIG. 1 is a block diagram illustrating an exemplary configuration of a part of base station 100 according to the present embodiment. In base station 100 illustrated in FIG. 1, transmission section 107 (e.g., corresponding to a transmitter) transmits control information (e.g., indication bit included in DCI for HARQ-ACK retransmission request to be described later) on a request for retransmission of a response signal (HARQ-ACK) for downlink data. Reception section 108 (e.g., corresponding to a receiver) receives the response signal retransmitted based on the control information.

Figure 2:
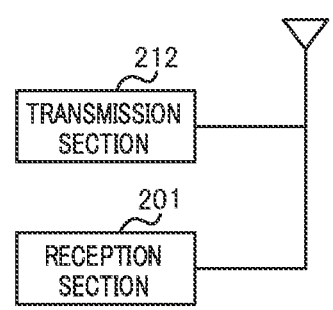
FIG. 2 is a block diagram illustrating an exemplary configuration of a part of a terminal.

FIG. 2 is a block diagram illustrating an exemplary configuration of a part of terminal 200 according to the present embodiment. In terminal 200 illustrated in FIG. 2, reception section 201 (e.g., corresponding to a receiver) receives the control information on the request for retransmission of the response signal for downlink data. Transmission section 212 (e.g., corresponding to a transmitter) transmits the response signal based on the control information.

Note that the control information transmitted by base station 100 and received by terminal 200 is information for identifying one of a plurality of candidate values on the number of the response signals requested to be retransmitted. In addition, the plurality of candidate values on the number of the response signals requested to be retransmitted are configured based on one of a plurality of granularities (hereinafter, also referred to as a quantize coefficient).

[Configuration of Base Station]

Figure 3:
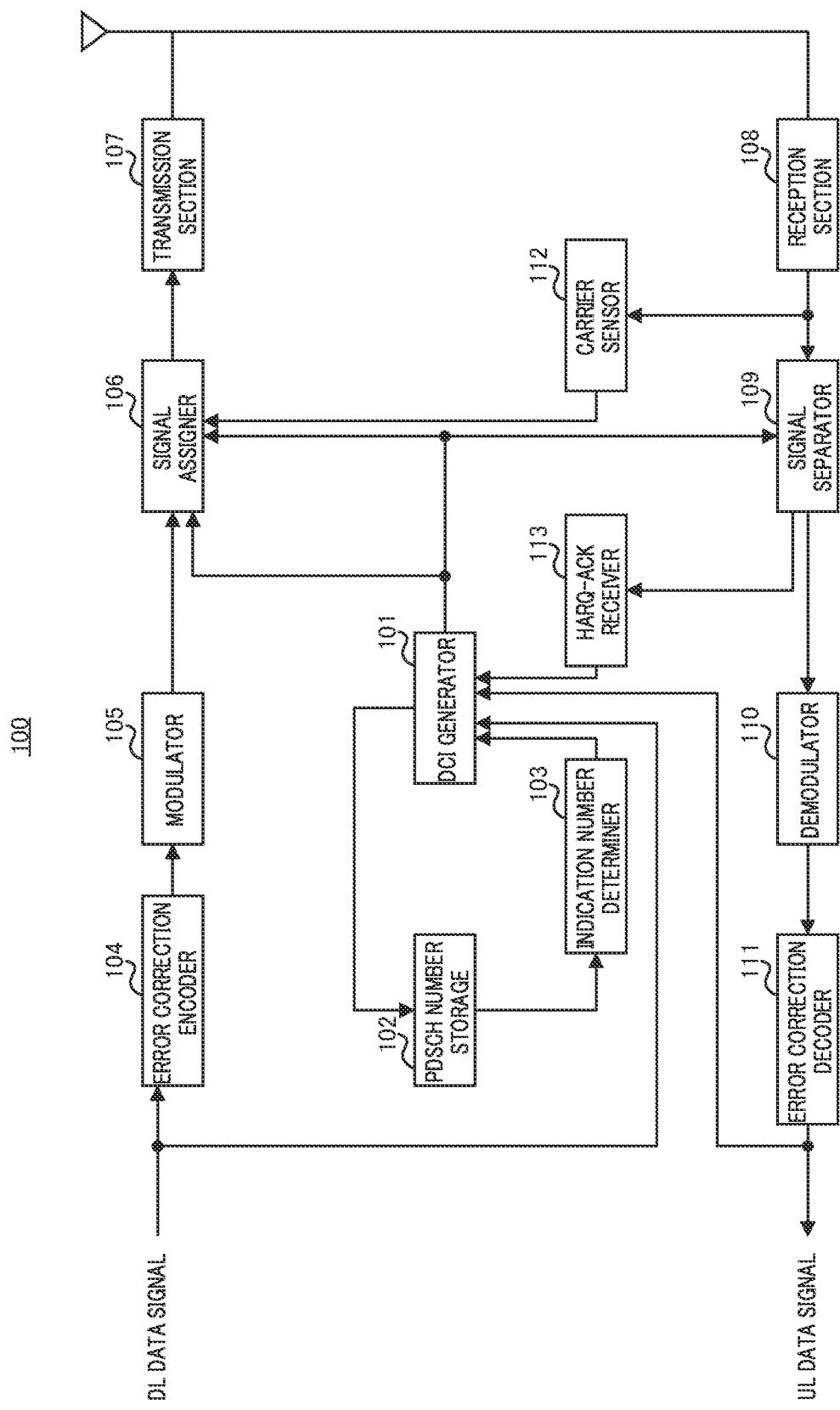
FIG. 3 is a block diagram illustrating an exemplary configuration of the base station according to Embodiment 1.

FIG. 3 is a block diagram illustrating an exemplary configuration of base station 100 according to the present embodiment. In FIG. 6, base station 100 includes DCI generator 101, PDSCH number storage 102, indication number determiner 103, error correction encoder 104, modulator 105, signal assigner 106, transmission section 107, reception section 108, signal separator 109, demodulator 110, error correction decoder 111, carrier sensor 112, and HARQ-ACK receiver 113.

DCI generator 101 generates DCI for DL control, for example. DCI generator 101 generates DCI including information on assignment of DL data (e.g., PDSCH), for example, based on information from a higher layer (not illustrated) or a DL data signal. In addition, DCI generator 101 may include, in the DCI, DAI (e.g., counter DAI and total DAI) corresponding to the DL data to which the resource is to be assigned. DCI generator 101 outputs, to PDSCH number storage 102, information on the DL data to which the resource is to be assigned (e.g., information on the number of PDSCHs to be transmitted).

DCI generator 101 also generates DCI for UL control, for example. DCI generator 101 generates DCI including information on assignment of a UL signal (e.g., PDSCH or HARQ-ACK) or information on a COT configuration in LBT, for example, based on information from a higher layer (not illustrated).

In addition, DCI generator 101 determines whether the retransmission of HARQ-ACK is required based on information inputted from error correction decoder 111 or HARQ-ACK receiver 113, and generates DCI (e.g., also referred to as Triggering DCI) including control information on a request for the retransmission of HARQ-ACK when requesting the retransmission of HARQ-ACK. For example, DCI generator 101 determines information, for terminal 200, on the number of HARQ-ACKs requested to be retransmitted based on information inputted from indication number determiner 103, and generates DCI including the determined information.

DCI generator 101 outputs transmission data including the generated DCI to signal assigner 106. DCI generator 101 also outputs a control signal including DL data assignment information to signal assigner 106. Further, DCI generator 101 outputs a control signal including UL signal assignment information to signal separator 109.

PDSCH number storage 102 temporarily stores the number of PDSCHs transmitted from base station 100 to terminal 200 (i.e., PDSCHs to which the resource is assigned), based on the information inputted from DCI generator 101. PDSCH number storage 102 outputs information on the stored number of PDSCHs to indication number determiner 103. The number of PDSCHs stored in PDSCH number storage 102 is, for example, the number of PDSCHs corresponding to HARQ-ACKs to be transmitted at once in the same resource. PDSCH number storage 102 may exclude, for example, the number of PDSCHs corresponding to successfully-received HARQ-ACKs from the number of PDSCHs to be stored therein. PDSCH number storage 102 may also exclude, for example, the number of PDSCHs corresponding to HARQ-ACKs that have not been successfully received but no longer need to be retransmitted from the number of PDSCHs to be stored therein.

Indication number determiner 103 determines information on the number of HARQ-ACKs to be indicated to terminal 200 based on the information on the number of PDSCHs inputted from PDSCH number storage 102 and information inputted from a higher layer (not illustrated), and outputs the information to DCI generator 101. Note that a method of determining the number of HARQ-ACKs to be indicated to terminal 200 will be described later.

Error correction encoder 104 performs error correction coding on a transmission data signal (DL data signal) and higher layer signaling, and outputs the coded signals to modulator 105.

Modulator 105 performs modulation processing on the signals inputted from error correction encoder 104, and outputs the modulated data signal to signal assigner 106.

Signal assigner 106 assigns, to a resource, a DL signal (i.e., transmission signal) including at least one of the data signal (e.g., DL data signal or higher layer signaling) inputted from modulator 105 and DCI inputted from DCI generator 101, based on the assignment information inputted from DCI generator 101 and a determination result inputted from carrier sensor 112, for example. The formed transmission signal is outputted to transmission section 107.

Transmission section 107 performs radio transmission processing, such as up-conversion, on the signal inputted from signal assigner 106, and transmits the signal to terminal 200 via an antenna.

Reception section 108 receives the signal transmitted from terminal 200 via the antenna, performs radio reception processing, such as down-conversion, and outputs the signal to signal separator 109 and carrier sensor 112.

Signal separator 109 separates the signal inputted from reception section 108 based on, for example, the assignment information inputted from DCI generator 101. Signal separator 109 outputs the separated data signal (e.g., UL data signal) and UL control signal to demodulator 110, and the UL control signal including HARQ-ACK to HARQ-ACK receiver 113.

Demodulator 110 performs demodulation processing on the signal inputted from signal separator 109, and outputs the obtained signal to error correction decoder 111.

Error correction decoder 111 decodes the signal inputted from demodulator 110, and acquires the received data signal (UL data signal) from terminal 200. Error correction decoder 111 also outputs information on a result of the decoding of the UL control signal including HARQ-ACK to DCI generator 101.

When confirming (i.e., investigating or searching) the usage of the band by LBT, carrier sensor 112 investigates the usage of the band by LBT using the signal inputted from reception section 108, and determines the band to be used for communication by base station 100. Carrier sensor 112 outputs the determination result to signal assigner 106.

HARQ-ACK receiver 113 detects (i.e., receives) HARQ-ACK transmitted from terminal 200 in the assigned resource based on the UL control signal (e.g., PUCCH) inputted from signal separator 109. When PUCCH transmission from terminal 200 is not confirmed from the detection result, HARQ-ACK receiver 113 outputs an indication of a request for the retransmission of HARQ-ACK included in the PUCCH to DCI generator 101.

[Configuration of Terminal]

Figure 4:
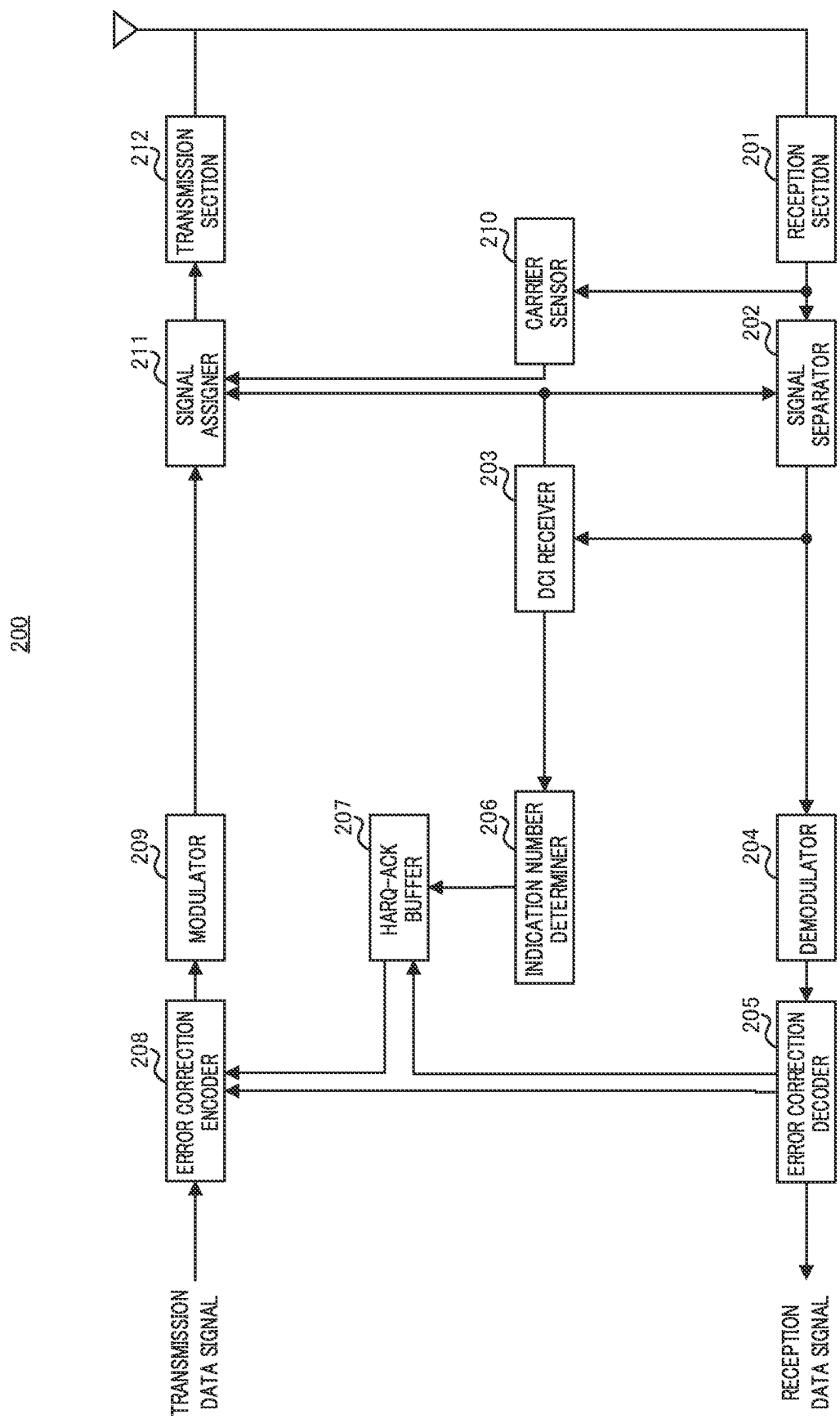
FIG. 4 is a block diagram illustrating an exemplary configuration of the terminal according to Embodiment 1.

FIG. 4 is a block diagram illustrating an exemplary configuration of terminal 200 according to the present embodiment. In FIG. 4, terminal 200 includes reception section 201, signal separator 202, DCI receiver 203, demodulator 204, error correction decoder 205, indication number determiner 206, HARQ-ACK buffer 207, error correction encoder 208, modulator 209, carrier sensor 210, signal assigner 211, and transmission section 212.

Reception section 201 receives a reception signal via an antenna, and outputs the signal to signal separator 202 and carrier sensor 210 after performing reception processing such as down-conversion.

Signal separator 202 separates a signal component corresponding to a position (i.e., search space) of a downlink control channel (e.g., Physical Downlink Control Channel (PDCCH)) candidate from a signal inputted from reception section 201, and outputs the signal component to DCI receiver 203. In addition, signal separator 202 separates the DL signal (e.g., DL data signal or higher layer signaling) from the signal inputted from reception section 201 based on the assignment information inputted from DCI receiver 203, and outputs the signal to demodulator 204.

DCI receiver 203 monitors (i.e., blind-decodes) the signal component inputted from signal separator 202 and detects (i.e., receives) DCI addressed to terminal 200. DCI receiver 203 decodes and receives the DCI detected by monitoring. DCI receiver 203 respectively outputs the DL assignment information, the UL assignment information, the information on the HARQ-ACK retransmission request in the decoded DCI to signal separator 202, signal assigner 211, and indication number determiner 206.

Demodulator 204 performs demodulation processing on the signal inputted from signal separator 202, and outputs the signal obtained by the demodulation to error correction decoder 205.

Error correction decoder 205 decodes the signal inputted from demodulator 204, and outputs the obtained received data signal. Error correction decoder 205 also performs error detection on the received data signal, and outputs HARQ-ACK indicating a result of the error detection (i.e., decoding result) to HARQ-ACK buffer 207 and error correction encoder 208.

Indication number determiner 206 determines the number of HARQ-ACKs for which the retransmission is requested from base station 100 based on the information on the HARQ-ACK retransmission request inputted from DCI receiver 203 and information (not illustrated) for determining the number of HARQ-ACKs inputted from a higher layer. Indication number determiner 206 outputs information on the determined number of HARQ-ACKs to HARQ-ACK buffer 207.

HARQ-ACK buffer 207 stores the decoding result of the DL data signal (i.e., HARQ-ACK) inputted from error correction decoder 205. HARQ-ACK buffer 207 also outputs the stored HARQ-ACK (i.e., HARQ-ACK requested to be retransmitted) to error correction encoder 208 based on the information on the number of HARQ-ACKs inputted from indication number determiner 206.

Error correction encoder 208 performs error correction coding on a transmission data signal (UL data signal) and HARQ-ACK inputted from error correction decoder 205 or HARQ-ACK buffer 207, and outputs the coded signal to modulator 209.

Modulator 209 modulates the signal inputted from error correction encoder 208, and outputs the modulated signal to signal assigner 211.

When confirming (i.e., investigating or searching) the usage of the band by LBT, carrier sensor 210 investigates the usage of the band by LBT using the signal inputted from reception section 201, and determines the band to be used for communication by terminal 200. Carrier sensor 210 outputs the determination result to signal assigner 211.

Signal assigner 211 assigns the signal (e.g., UL data signal or HARQ-ACK) inputted from modulator 209 to a radio resource based on the information inputted from DCI receiver 203 (e.g., UL assignment information or COT configuration) and the determination result inputted from carrier sensor 210, and outputs the signal to transmission section 212.

Transmission section 212 performs radio transmission processing, such as up-conversion, on the signal inputted from signal assigner 211, and transmits the signal via the antenna.

[Operations of Base Station 100 and Terminal 200]

Next, operations of base station 100 (see FIG. 3) and terminal 200 (see FIG. 4) will be described in detail.

Figure 5:
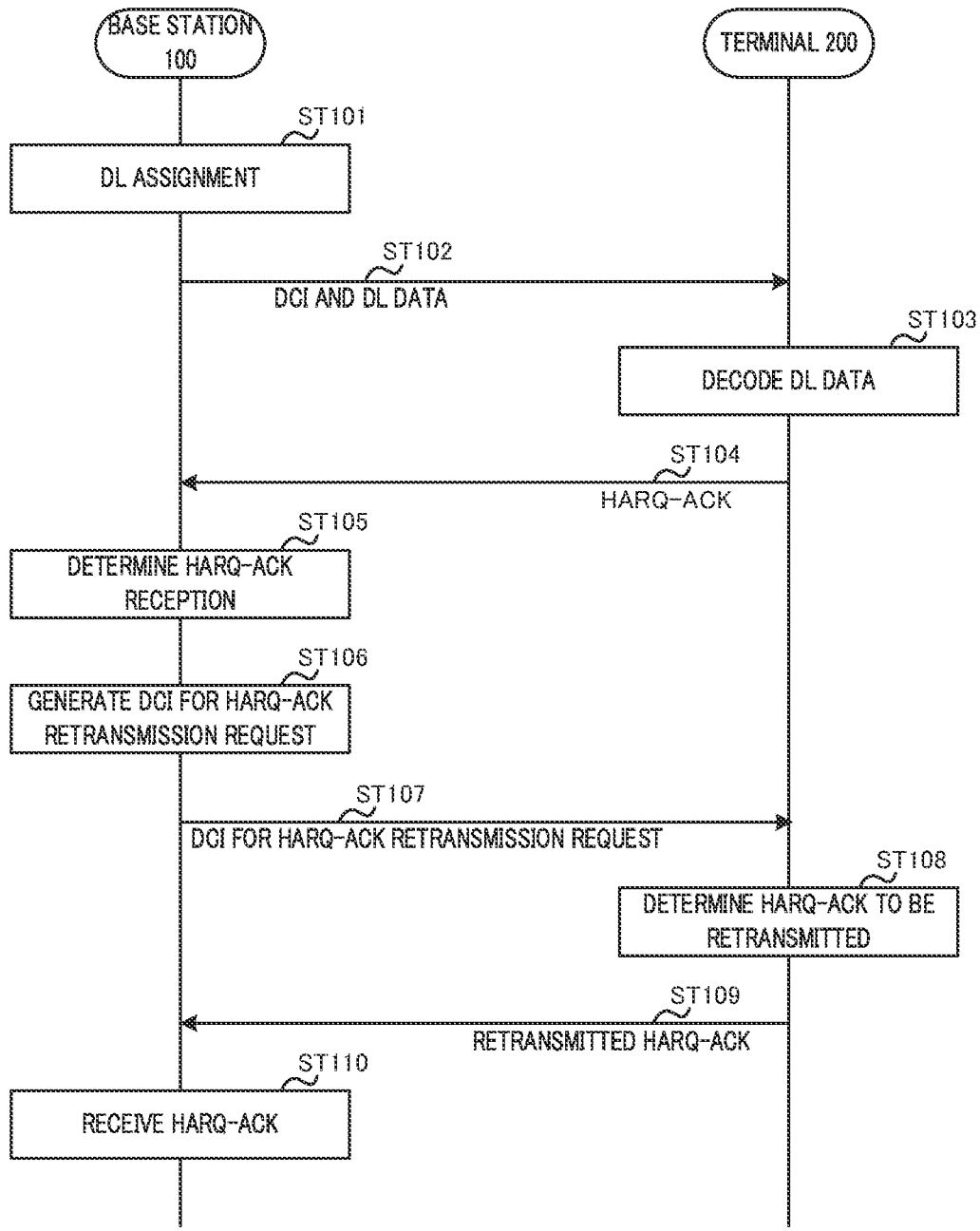
FIG. 5 is a sequence diagram describing exemplary operations of the base station and the terminal.

FIG. 5 is a sequence diagram describing exemplary processing in base station 100 and terminal 200 according to the present embodiment.

In FIG. 5, base station 100 assigns DL data (PDSCH) for terminal 200, and generates DCI including information on the DL assignment (ST101). At this time, base station 100 may assign a UL resource for transmitting HARQ-ACK to the DL data. Base station 100 may also indicate, to terminal 200, the total number of the DL data, the HARQ-ACK transmission for which is assigned the UL resource, for example. Base station 100 may also indicate the total number of the DL data to terminal 200 using a result of a modulo operation obtained by dividing the total number of the DL data by a certain number (for example, 4).

Base station 100 transmits the DCI and the DL data to terminal 200 (ST102). Note that base station 100 may perform the processes of ST101 and ST102 a plurality of times in FIG. 5. At this time, base station 100 stores the number of assigned DL data (i.e., PDSCH to be transmitted).

Terminal 200 receives the DL data based on the DCI transmitted from base station 100, and decodes the DL data (ST103). Terminal 200 transmits (i.e., feeds back) HARQ-ACK based on the decoding result of the DL data to base station 100 (ST104).

Note that terminal 200 fails to detect the DCI (e.g., PDCCH) in some cases, for example. In such a case, terminal 200 cannot recognize the transmission of the DL data from base station 100 and no HARQ-ACK is transmitted. Further, no HARQ-ACK is transmitted either when, for example, terminal 200 does not acquire the opportunity of transmitting a UL signal depending on the determination result of LBT or configured COT.

Base station 100 determines whether the HARQ-ACK is received in the UL resource that has been assigned for the HARQ-ACK transmission with the assignment of the DL data (ST105).

When no HARQ-ACK is received (e.g., when decoding of HARQ-ACK is failed), base station 100 generates DCI including control information on a request for retransmission of HARQ-ACK (e.g., referred to as DCI for HARQ-ACK retransmission request) (ST106). The DCI for HARQ-ACK retransmission request may include information on the number of HARQ-ACKs requested to be retransmitted, for example. The information on the number of HARQ-ACKs requested to be retransmitted may indicate, for example, the number of HARQ-ACKs (i.e., the number of PDSCHs transmitted to terminal 200) or a quantized value of the number of HARQ-ACKs. Note that the method of indicating the number of HARQ-ACKs requested to be retransmitted is, for example, shared between base station 100 and terminal 200. Base station 100 transmits the DCI for HARQ-ACK retransmission request to terminal 200 (ST107).

Terminal 200 determines HARQ-ACK to be retransmitted (or the number of HARQ-ACKs to be retransmitted) based on the DCI for HARQ-ACK retransmission request transmitted from base station 100 (ST108). For example, terminal 200 selects HARQ-ACK to be retransmitted from among buffered HARQ-ACKs based on the information on the number of HARQ-ACKs included in the DCI for HARQ-ACK retransmission request. Terminal 200 retransmits the selected HARQ-ACK (ST109), and base station 100 receives the retransmitted HARQ-ACK (ST110).

Next, descriptions will be given of exemplary methods of indicating the number of HARQ-ACKs requested to be retransmitted, indicated from base station 100 to terminal 200.

<Method 1>

In Method 1, a value corresponding to the total number of PDSCHs transmitted from base station 100 to terminal 200 (i.e., the total number of HARQ-ACKs for PDSCHs) is indicated as the number of HARQ-ACKs requested to be retransmitted, for example.

In addition, the number of HARQ-ACKs requested to be retransmitted (or referred to as HARQ codebook size) may be a quantized value, an example of which will be described later.

Base station 100 and terminal 200 may, for example, share associations between the numbers of HARQ-ACKs requested to be retransmitted and values of an indication bit (e.g., bit values) that identifies (i.e., indicates) the number of HARQ-ACKs requested to be retransmitted.

In this case, base station 100 determines, for example, the number of HARQ-ACKs to request the retransmission of which, and transmits the DCI for HARQ-ACK retransmission request to terminal 200 including the indication bit value associated with the determined number of HARQ-ACKs. Terminal 200 determines the number of HARQ-ACKs associated with the indication bit value included in the DCI indicated from base station 100.

FIG. 6 illustrates exemplary associations between the number of HARQ-ACKs requested to be retransmitted and the indication bit (e.g., bit values) according to Method 1.

By way of example, candidate values for the number of HARQ-ACKs requested to be retransmitted are represented in 3 bits (any of 000 to 111) in FIG. 6. Note that the number of bits is not limited to 3 bits, and may be represented in another number of bits.

Further, in FIG. 6, the candidate values for the number of HARQ-ACKs requested to be retransmitted are quantized in units of three, by way of example (hereinafter, represented in that the quantize coefficient=3). Note that the quantize coefficient may be referred to as, for example, a step size, a step width, a granularity, and the like. Thus, in FIG. 6, the bit values (000 to 111) are respectively associated with the candidate values (3, 6, 9, 12, 15, 18, 21, and 24) for the number of HARQ-ACKs requested to be retransmitted, configured based on the quantize coefficient=3. That is, the indication bit value (any of 000 to 111) is information that identifies one of the plurality of candidate values for the number of HARQ-ACKs requested to be retransmitted.

For example, when the number of HARQ-ACKs requested to be retransmitted is 0 or any of 1 to 3 (i.e., 3 or less), the DCI for HARQ-ACK retransmission request includes the indication bit=000. When the number of HARQ-ACKs requested to be retransmitted is any of 4 to 6 (i.e., 6 or less), the DCI for HARQ-ACK retransmission request includes the indication bit=001. The same applies to the other numbers of HARQ-ACKs requested to be retransmitted in FIG. 6.

As an example, a description will be given of a case where there are six PDSCHs for which base station 100 does not receive (or fails to decode) HARQ-ACKs.

In this case, base station 100 (e.g., indication number determiner 103) determines to request the retransmission of six HARQ-ACKs. Base station 100 then refers to the association in FIG. 6, for example, and transmits, to terminal 200, the DCI (DCI for HARQ-ACK retransmission request) including indication bit "001" that corresponds to the number of HARQ-ACKs requested to be retransmitted=6.

When the indication bit indicated in the DCI for HARQ-ACK retransmission request is "001", terminal 200 (e.g., indication number determiner 206) determines that the retransmission of six HARQ-ACKs is requested based on, for example, the association in FIG. 6. Terminal 200 then selects six HARQ-ACKs from HARQ-ACKs buffered in HARQ-ACK buffer 207, and transmits the six HARQ-ACKs to base station 100.

This allows base station 100 to receive six HARQ-ACKs to be retransmitted from terminal 200.

Next, a description will be given of a case where there are five PDSCHs for which base station 100 does not receive (or fails to decode) HARQ-ACKs, as another example.

In this case, base station 100 (e.g., indication number determiner 103) determines to request the retransmission of five HARQ-ACKs. Base station 100 then refers to the association in FIG. 6, for example, and transmits, to terminal 200, the DCI (DCI for HARQ-ACK retransmission request) including indication bit "001" that corresponds to the number of HARQ-ACKs requested to be retransmitted=5 (i.e., 6 or less).

When the indication bit indicated in the DCI for HARQ-ACK retransmission request is "001", terminal 200 (e.g., indication number determiner 206) determines that the retransmission of six HARQ-ACKs is requested based on, for example, the association in FIG. 6. Terminal 200 then selects six HARQ-ACKs from HARQ-ACKs buffered in HARQ-ACK buffer 207, and transmits the six HARQ-ACKs to base station 100.

As described above, when the indication bit is "001" in FIG. 6, the number of HARQ-ACKs requested by base station 100 to be retransmitted is any one of 4 to 6. In response to this, terminal 200 may transmit, for example, the maximum number of HARQ-ACKs represented by the indication bit, which is 6 in the case of indication bit "001". When terminal 200 retransmits HARQ-ACKs (e.g., 6 in the above example) more than the number of HARQ-ACKs actually buffered (e.g., 5 in the above example), for example, terminal 200 only needs to retransmit HARQ-ACK (1 in the above example) indicating that terminal 200 does not receive PDSCH, in addition to HARQ-ACKs (5 in the above example) actually buffered. Further, base station 100 only needs to discard the extra HARQ-ACK when terminal 200 retransmits HARQ-ACKs more than the number of HARQ-ACKs requested to be retransmitted (5 in the above example) since base station 100 recognizes the number of PDSCHs transmitted to terminal 200 (i.e., the number of HARQ-ACKs to be retransmitted by terminal 200).

This allows base station 100 to receive five HARQ-ACKs to be retransmitted from terminal 200.

Note that the same applies to another case where the number of HARQ-ACKs requested to be retransmitted is different from five or six described above.

Further, the case where the quantize coefficient=3 has been described in FIG. 6, by way of example, but the quantize coefficient is not limited to 3. Furthermore, the quantize coefficient is not limited to be fixed, and may be configured to be variable. In other words, the candidate values for the number of HARQ-ACKs requested to be retransmitted may be configured based on one of a plurality of quantize coefficients (e.g., granularities).

A method of configuring the quantize coefficient (i.e., the maximum number of HARQ-ACKs that can be indicated by the indication bit) will be described below.

For example, base station 100 (e.g., indication number determiner 103) may determine the quantize coefficient based on at least one of "a number based on the number of CAs (Carrier Aggregations)" and "the number of HARQ processes". The number based on CAs and the number of HARQ processes may be provided to base station 100 and terminal 200 by a higher layer, for example.

For example, base station 100 (e.g., indication number determiner 103) may determine the quantize coefficient according to the number based on the number of CAs (e.g., expressed as $N_{CA}$), the number of HARQ processes (e.g., expressed as $N_{HARQ\ process}$), and the number of indication bits (e.g., expressed as Bitwidth).

For example, the number of indication bits (Bitwidth), the number based on the number of CAs ($N_{CA}$), the number of HARQ processes ($N_{HARQ\ process}$), and the quantize coefficient may have the relation represented in the following equation.

[1]

$$\text{Bitwidth} = \log_2\left(\frac{N_{CA} N_{HARQ\ process}}{\text{quantize coefficient}}\right) \quad \text{(Equation 1)}$$

In Equation 1, when the number of indication bits is constant, the greater the number of CAs is, the greater the value configured to the quantize coefficient is, for example. Likewise, in Equation 1, when the number of indication bits is constant, the greater the number of HARQ processes is, the greater the value configured to the quantize coefficient is, for example.

In the example illustrated in FIG. 6 for example, when the number of indication bits (Bitwidth) is 3 bits, the number of CAs ($N_{CA}$) is 3, and the number of HARQ processes ($N_{HARQ\ process}$) is 8 processes, the quantize coefficient is configured as 3 based on Equation 1.

Terminal 200 is indicated the information used for calculating the number of HARQ-ACKs (e.g., quantize coefficient, the number based on the number of CAs, the number of HARQ processes, etc.) from base station 100, and may determine the number of HARQ-ACKs based on, for example, the same equation 1 used by base station 100.

Further, for example, at least one candidate for patterns (i.e., combinations) of the number of indications bits (Bitwidth), the number based on the number of CAs ($N_{CA}$), the number of HARQ processes ($N_{HARQ\ process}$), and the quantize coefficient may be indicated from base station 100 to terminal 200 by the higher layer or DCI, and may be specified in advance for base station 100 and terminal 200.

In this case, the indication of any one of a plurality of pattern candidates from base station 100 to terminal 200 enables base station 100 and terminal 200 to share the association between the indication bit and the number of HARQ-ACKs requested to be retransmitted.

By way of example, a plurality of candidates for the quantize coefficients may be configured for terminal 200, for example. The plurality of candidates for the quantize coefficients may be indicated to terminal 200 by higher layer signaling, or may be specified, for example. In this case, base station 100 may indicate, to terminal 200, one of the plurality of candidates for the quantize coefficient that is actually configured.

When the number of indication bits (Bitwidth) is 3 bits (fixed value) and the quantize coefficient indicated from base station 100 to terminal 200 is 3, for example, the indication bit (any of 000 to 111) enables a configuration of a range of 0 to 24 to the number of HARQ-ACKs requested to be retransmitted, as illustrated in FIG. 6. For example, when the quantize coefficient indicated from base station 100 to terminal 200 is 2, the indication bit (any of 000 to 111) enables a configuration of a range of 0 to 16 to the number of HARQ-ACKs requested to be retransmitted. Likewise, when the quantize coefficient indicated from base station 100 to terminal 200 is 4, for example, the indication bit (any of 000 to 111) enables a configuration of a range of 0 to 32 to the number of HARQ-ACKs requested to be retransmitted. The same applies to another value of the quantize coefficient.

As described above, when the quantize coefficient is variable, the range of the number of HARQ-ACKs requested to be retransmitted can be variably configured by the same number of indication bits. Base station 100 may estimate the maximum value of the number of HARQ-ACKs requested to be retransmitted, according to a parameter (e.g., the number of CAs or the number of HARQ processes) configured to terminal 200, for example, and may configure the quantize coefficient based on the estimation value.

Further, base station 100 and terminal 200 may use, for example, a modulo operation result obtained by dividing by the maximum value (e.g., 24) of the number of HARQ-ACKs requested to be retransmitted, illustrated in FIG. 6. For example, when the number of HARQ-ACKs requested by base station 100 to be retransmitted is greater than 24, which is the maximum value of the candidate values for the number of HARQ-ACKs requested to be retransmitted illustrated in FIG. 6, the indication bit (e.g., any of 000 to 111) may indicate a value based on the remainder (e.g., value with 1 added) obtained by dividing the actual number of the response signals requested to be retransmitted (e.g., greater than 24) by the maximum value of the candidate values for the number of HARQ-ACKs. This allows base station 100 to indicate, to terminal 200, the number of HARQ-ACKs greater than the maximum value of the number of HARQ-ACKs (24 in FIG. 6) represented by the indication bit that can be indicated by the DCI for HARQ-ACK retransmission request.

Although the case where the quantize coefficient takes a variable value has been described above, the present disclosure is not limited to this, and the number of indication bits (Bitwidth) may be variable, for example.

<Method 2>

In Method 2, the maximum value of the number of requested HARQ-ACKs according to the number based on the number of CAs ($N_{CA}$) and the number of HARQ processes ($N_{HARQ\ process}$), for example, is configured to the maximum bit string of the indication bit.

FIG. 7 illustrates exemplary associations between the number of HARQ-ACKs requested to be retransmitted and the indication bit (e.g., bit values) according to Method 2.

FIG. 7 illustrates a case where the number based on the number of CAs ($N_{CA}$) is 3, the number of HARQ processes ($N_{HARQ\ process}$) is 8, and the number of indication bits (Bitwidth) is 3 bits, by way of example. The maximum value of the number of requested HARQ-ACKs is thus estimated to be 24 by multiplying $N_{CA}$ by $N_{HARQ\ process}$ in FIG. 7.

In FIG. 7, the value 24 of the number of HARQ-ACKs requested to be retransmitted is associated with the maximum bit string "111" of the indication bit. Further, in FIG. 7, the values 0 to 6 of the number of HARQ-ACKs requested to be retransmitted are respectively associated in ascending order with the bit strings "000" to "110" other than the maximum bit string "111" of the indication bit, for example. In other words, the quantize coefficient 1 is configured to the bit strings "000" to "110" in FIG. 7. Note that the quantize coefficient is not limited to 1, and another value may be used in Method 2.

Method 1 and Method 2 have been described, thus far.

As described above, the indication bit indicating the number of HARQ-ACKs requested to be retransmitted is indicated from base station 100 to terminal 200 in the present embodiment. As illustrated in FIGS. 6 and 7 for example, the number of HARQ-ACKs requested to be retransmitted indicated by the indication bit is a value indicating the total number of PDSCHs transmitted by base station 100 to terminal 200, for example.

This enables terminal 200 to correctly recognize the number of HARQ-ACKs requested by base station 100 to be retransmitted based on the DCI for HARQ-ACK retransmission request, even when, for example, terminal 200 fails to receive DCI including counter/total DAI (e.g., value of an operation result of the modulo operation) several times and fails to identify the number of PDSCHs actually transmitted by base station 100.

Thus, the present embodiment allows terminal 200 to appropriately retransmit HARQ-ACKs, for example, even in the unlicensed band where the reception of DCI (i.e., PDCCH) is more likely to be failed compared with the licensed band. In addition, the DCI for HARQ-ACK retransmission request allows base station 100 and terminal 200 to have common recognition of the number of HARQ-ACKs, thereby preventing base station 100 from failing to receive PUCCH.

Further, according to the present embodiment, the variable quantize coefficient of the number of HARQ-ACKs requested to be retransmitted, for example, allows base station 100 to variably configure the range of the number of HARQ-ACKs that can be indicated by the DCI for HARQ-ACK retransmission request. This enables the configuration of the range of the number of HARQ-ACKs requested to be retransmitted according to the parameter (e.g., the number of CAs and the number of HARQ processes) configured for terminal 200, for example, and it makes it easier for terminal 200 to correctly recognize the number of HARQ-ACKs requested by base station 100 to be retransmitted.

According to the present embodiment, base station 100 indicates, to terminal 200, a value obtained by quantizing the number of HARQ-ACKs requested to be retransmitted. This reduces the amount of information required for indicating the number of HARQ-ACKs requested to be retransmitted.

Note that the parameters serving as reference for determining the quantize coefficient are not limited to the number of CAs and the number of HARQ processes in the present embodiment, and may be any parameters that affect the number of HARQ-ACKs (increase or decrease), for example.

Further, the present embodiment is not limited to the case where the value obtained by quantizing the number of HARQ-ACKs requested to be retransmitted is indicated as described above. For example, a value (bit value) associated with the number of HARQ-ACKs requested to be retransmitted (i.e., unquantized value) may also be indicated.

Embodiment 2

In Embodiment 1, the description has been given of a case where the number of HARQ-ACKs requested to be retransmitted (or quantized value) is indicated from the base station to the terminal. In the present embodiment, a description will be given of a case of using a total DAI value (or quantized value) for indicating the number of HARQ-ACKs requested to be retransmitted.

Figure 8:
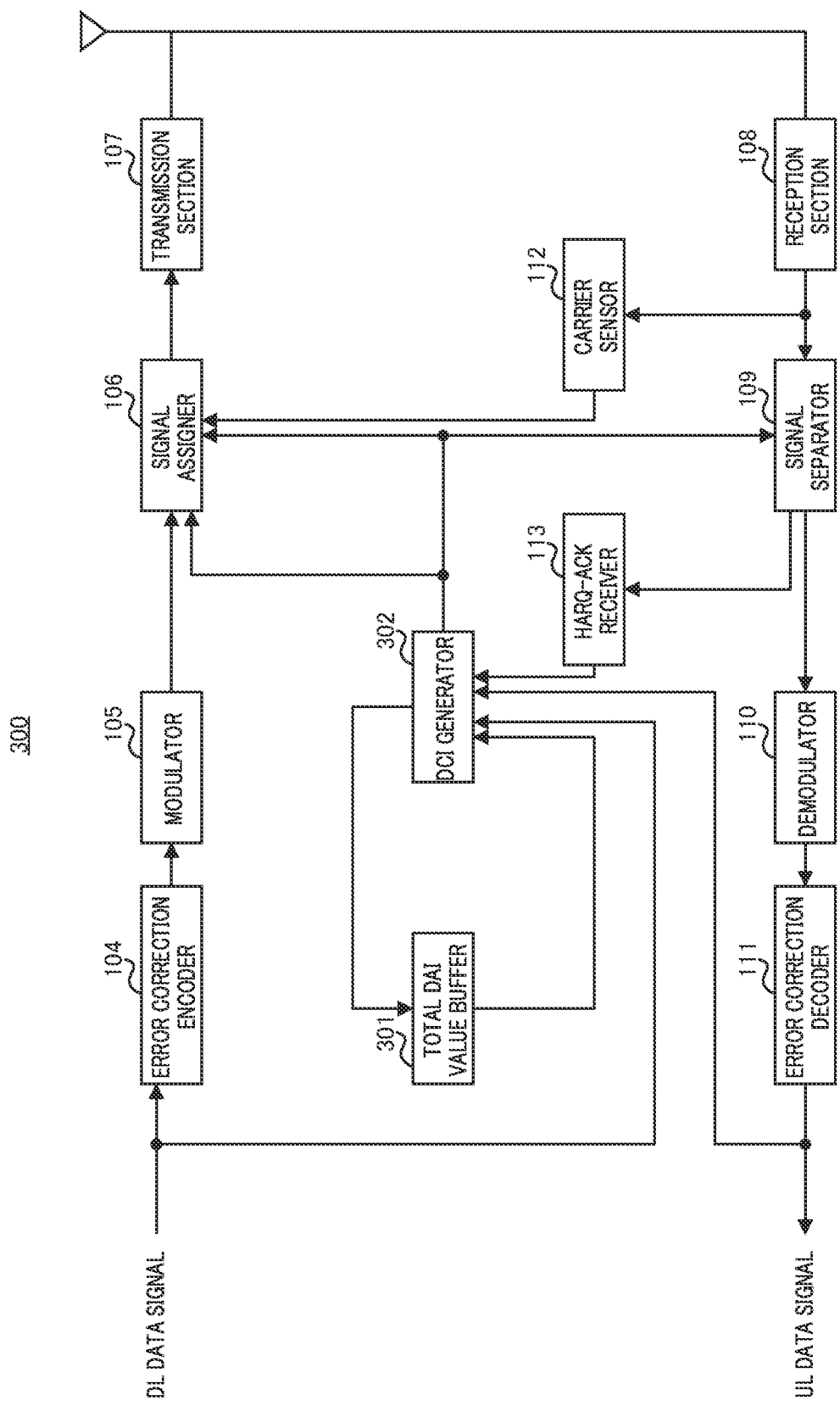
FIG. 8 is a block diagram illustrating an exemplary configuration of a base station according to Embodiment 2.

FIG. 8 is a block diagram illustrating an exemplary configuration of base station 300 according to the present embodiment. Note that, in FIG. 8, the same components as those in Embodiment 1 (see, for example, FIG. 3) are denoted by the same reference signs, and the descriptions thereof are omitted.

Base station 300 illustrated in FIG. 8 includes Total DAI value buffer 301 instead of PDSCH number storage 102 and indication number determiner 103 illustrated in FIG. 3.

Total DAI value buffer 301 temporarily stores a value of total DAI assigned to PDSCH in a slot where base station 300 has transmitted a DL data signal (e.g., PDSCH), based on the information on total DAI inputted from DCI generator 302. Total DAI value buffer 301 outputs the stored total DAI value to DCI generator 302. Total DAI value buffer 301 may exclude, for example, the total DAI configured to PDSCH corresponding to successfully-received HARQ-ACK from the total DAI to be stored therein. Total DAI value buffer 301 may also exclude, for example, the total DAI configured to PDSCH corresponding to HARQ-ACK that has not been successfully received but no longer needs to be retransmitted from the total DAI to be stored therein.

DCI generator 302 outputs, to Total DAI value buffer 301, a total DAI value configured in DL assignment (e.g., PDSCH assignment) that is, for example, a value based on a remainder (e.g., value with 1 added) obtained by dividing the total number of transmitted PDSCHs by a specified value (e.g., 4). In addition, DCI generator 302 determines whether the retransmission of HARQ-ACK is required based on the information inputted from error correction decoder 111 or HARQ-ACK receiver 113, and generates DCI (e.g., also referred to as Triggering DCI) including control information on a request for the retransmission of HARQ-ACK when requesting the retransmission of HARQ-ACK. For example, DCI generator 302 determines information on the total DAI value requested to terminal 400 based on the information inputted from Total DAI value buffer 301, and generates DCI including the determined information.

Figure 9:
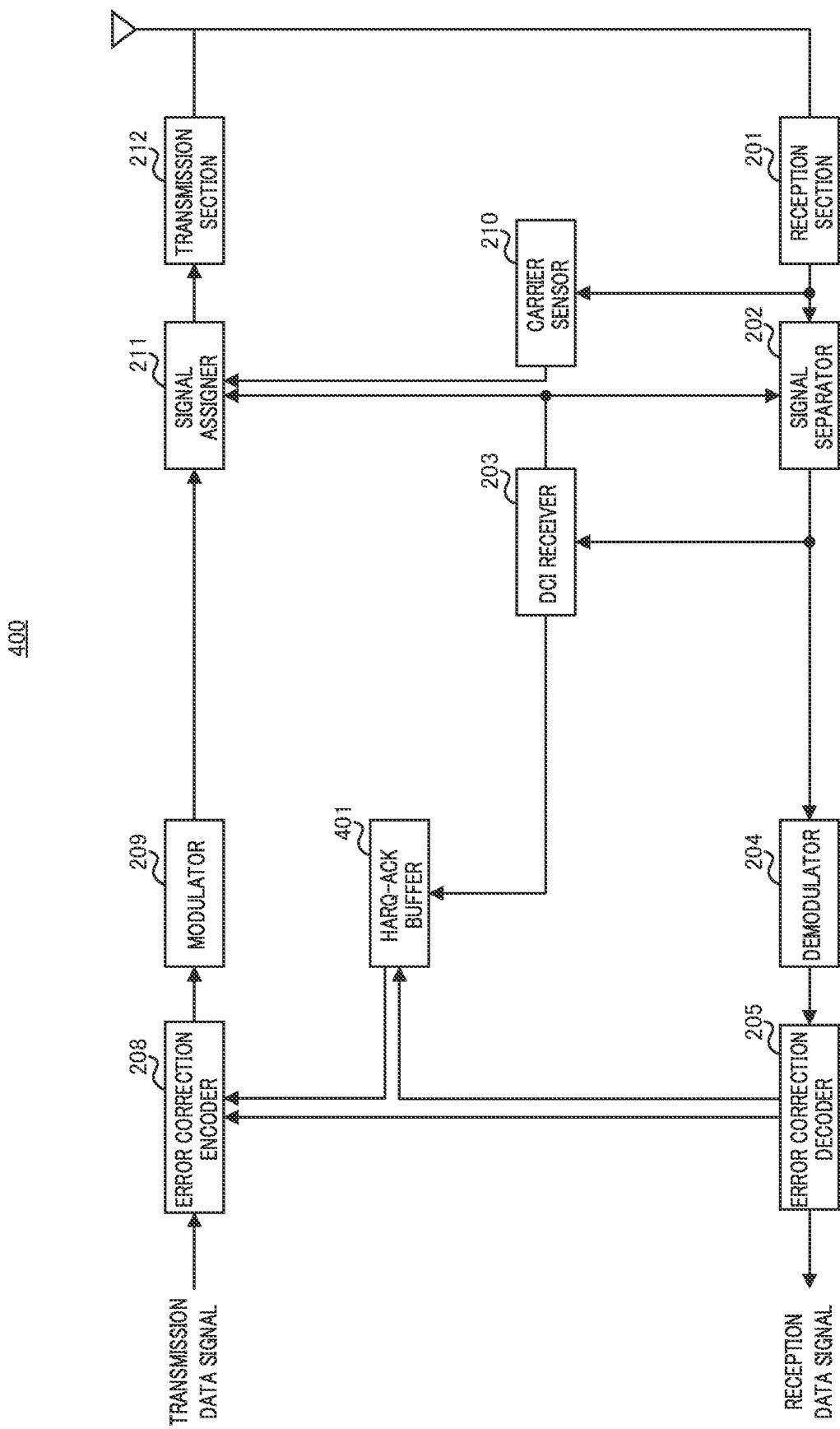
FIG. 9 is a block diagram illustrating an exemplary configuration of a terminal according to Embodiment 2.

FIG. 9 is a block diagram illustrating an exemplary configuration of terminal 400 according to the present embodiment. Note that, in FIG. 9, the same components as those in Embodiment 1 (see, for example, FIG. 4) are denoted by the same reference signs, and the descriptions thereof are omitted.

The total DAI value is inputted to HARQ-ACK buffer 401 from DCI receiver 203. HARQ-ACK buffer 401 outputs the stored HARQ-ACK (i.e., HARQ-ACK requested to be retransmitted) to error correction encoder 208 based on the total DAI value to be inputted.

Next, operations of base station 300 (see FIG. 8) and terminal 400 (see FIG. 9) will be described in detail.

Descriptions will be given below of exemplary methods of indicating the number of HARQ-ACKs requested to be retransmitted, indicated from base station 300 to terminal 400.

<Method 1>

Base station 300, for example, configures a total DAI value configured to the last-assigned PDSCH among PDSCHs corresponding to HARQ-ACKs requested to be retransmitted, as the information on the number of HARQ-ACKs to be indicated to terminal 400 in the DCI for HARQ-ACK retransmission request.

FIG. 10 illustrates exemplary associations between an indication bit (bit values) and the number of HARQ-ACKs requested to be retransmitted ($V_{DAI}$ indicating total DAI value) according to Method 1.

Note that, in FIG. 10, $V_{DAI}$ indicating the total DAI value is represented as a modulo operation value indicating a remainder obtained by dividing the total DAI value by 4, by way of example. For example, $V_{DAI}=(Y-1) \mod 4+1$ in FIG. 10. In FIG. 10, when the number of HARQ-ACKs requested to be retransmitted is 1, 5, 9, . . . , for example, $V_{DAI}=1$ and indication bit=00 are associated with each other. Likewise, in FIG. 10, when the number of HARQ-ACKs requested to be retransmitted is 2, 6, 10, . . . , $V_{DAI}=2$ and indication bit=01 are associated with each other. The same applies to the other numbers of HARQ-ACKs requested to be retransmitted in FIG. 10.

Note that, although $V_{DAI}$ indicating the total DAI value is represented as a modulo operation value (e.g., a value based on the remainder obtained by dividing the total number of PDSCHs by a specified value) in FIG. 10, the present embodiment is not limited to this, and $V_{DAI}$ may be represented as the total DAI value (e.g., the total number of PDSCHs).

For example, terminal 400 may determine the minimum value in the total DAIs that are equal to or greater than the number of HARQ-ACKs buffered in terminal 400 among the numbers of HARQ_ACKs associated with the indication bit (bit value) indicated by the DCI for HARQ-ACK retransmission request. For example, when terminal 400 has buffered 5 HARQ-ACKs and indication bit "01" is indicated by the DCI for HARQ-ACK retransmission request, terminal 400 may determine 6, which is the minimum value equal to or greater than 5 among 2, 6, 10, . . . associated with indication bit "01", as the number of HARQ-ACKs requested by base station 300 to be retransmitted.

As described above, terminal 400 can determine the number of HARQ-ACKs requested by base station 300 based on not the last PDSCH received by terminal 400 (i.e., total DAI recognized by terminal 400) but the total DAI including PDSCH that terminal 400 has not received (e.g., PDSCH for which decoding of PDCCH has failed).

This aligns the number of HARQ-ACKs requested by base station 300 to be retransmitted and the number of HARQ-ACKs retransmitted by terminal 400.

Note that the number of indication bits is not limited to 2 bits, and may be another number of bits.

<Method 2>

In Method 2, for example, a quantized value of the total DAI value indicated in Method 1 (e.g., $V_{DAI}$ illustrated in FIG. 10) is indicated.

FIG. 11 illustrates exemplary associations between the indication bit (bit values) and the number of HARQ-ACKs requested to be retransmitted ($V_{DAI}$ indicating total DAI value) according to Method 2. As illustrated in FIG. 11, the numbers of HARQ_ACKs (1, 2, 5, 6, 9, 10, . . . ) corresponding to $V_{DAI}$=0 and 1 illustrated in FIG. 10 are associated with indication bit "01", and the numbers of HARQ_ACKs (3, 4, 7, 8, 11, 12, . . . ) corresponding to $V_{DAI}$=2 and 3 illustrated in FIG. 10 are associated with indication bit "10".

In FIG. 11, when the DCI for HARQ-ACK retransmission request indicates indication bit "01" or "10", for example, terminal 400 determines the number of HARQ-ACKs requested to be retransmitted in the same manner as in Method 1. Further, in FIG. 11, when the DCI for HARQ-ACK retransmission request indicates indication bit "00" or "11", for example, terminal 400 determines that no retransmission of HARQ-ACK is requested.

Note that the number of indication bits is not limited to 2 bits, and may be another number of bits.

Method 1 and Method 2 have been described, thus far.

In the present embodiment, base station 300 indicates, to terminal 400, the indication bit associated with the total DAI value corresponding to the number of HARQ-ACKs requested to be retransmitted, as described above. This makes it easier for terminal 400 to correctly recognize the number of HARQ-ACKs requested by base station 300 to be retransmitted. Thus, the present embodiment allows terminal 400 to appropriately retransmit HARQ-ACKs, for example, even in the unlicensed band where the reception of DCI (i.e., PDCCH) is more likely to be failed compared with the licensed band.

Further, the present embodiment allows base station 300 to reuse the total DAI value indicated in PDSCH assignment for the indication of the number of HARQ-ACKs requested to be retransmitted.

Embodiment 3

In Embodiment 1 and Embodiment 2, the DCI (e.g., the DCI for HARQ-ACK retransmission request) used by the base station (e.g., base station 100 or base station 300) to indicate the number of HARQ-ACKs requested to be retransmitted to the terminal (e.g., terminal 200 or terminal 400) may be, for example, DCI assigning no PDSCH. The number of HARQ-ACKs requested to be retransmitted for a plurality of terminals may be collectively indicated in the DCI assigning no PDSCH.

FIG. 12 illustrates an exemplary configuration of the DCI for HARQ-ACK retransmission request according to the present embodiment.

In addition, FIG. 13 illustrates exemplary associations of the indication bit (bit values) indicated by the DCI illustrated in FIG. 12 and the number of HARQ-ACKs requested to be retransmitted. In FIG. 13, the number of the indication bits is 2 bits, and the quantize coefficient, which has been described in Embodiment 1, is 2.

As illustrated in FIG. 12, the DCI is configured with indication areas of the number of HARQ-ACKs requested to be retransmitted for respective terminals (UE) #1 to #N. For example, indication bit "01" requesting retransmission is configured in the indication area for UE #1 in the DCI illustrated in FIG. 12. Thus, UE #1 refers to FIG. 13, for example, and determines that 2 HARQ-ACKs associated with indication bit "01" are requested to be retransmitted. In FIG. 12, other terminals (UE #2, #3, #4, UE #N) are also respectively requested to retransmit 4, 0, 4, and 6 of HARQ-ACKs in the DCI.

Each terminal determines the number of HARQ-ACKs requested to be retransmitted based on the indication bit indicated in the indication area for that terminal among the indication areas in the DCI indicated from a base station. Note that the indication area for each terminal in the DCI may be indicated to each terminal in advance by higher layer signaling, or may be determined by each terminal based on the PDSCH assignment area or the like.

In the present embodiment, the base station transmits the DCI that includes the control information (e.g., indication bit) on the number of HARQ-ACKs requested to be retransmitted and does not include the PDSCH resource assignment information, as described above. This allows the terminal to apply the same monitoring method as that for other DCIs, for example, by adopting the same payload as that for other DCIs for the DCI for HARQ-ACK retransmission request. Further, as illustrated in FIG. 12, the base station can collectively request the number of HARQ-ACKs to be retransmitted to a plurality of terminals by the DCI for HARQ-ACK retransmission request.

Note that a terminal for monitoring the DCI illustrated in FIG. 12 may be configured. For example, higher layer signaling may indicate to the terminal that the terminal monitors the DCI illustrated in FIG. 12.

Further, the area where the DCI illustrated in FIG. 12 is transmitted may be an area called a common search space, or an area called a group common search space, for example. This makes it easier for the DCI for HARQ-ACK retransmission request to be monitored simultaneously by a plurality of terminals.

The format used for the DCI illustrated in FIG. 12 may have the same size as another DCI format, and may be distinguished from another DCI by a Radio Network Temporary Identifier (RNTI).

Incidentally, the DCI not assigning PDSCH may be used as the DCI that the base station uses for indicating the number of HARQ-ACKs requested to be retransmitted to the terminal, and may be indicated to a single terminal, for example. In this case, the area where the DCI (e.g., also referred to as dedicated DCI) is transmitted may be an area called a common search space or a group common search space, or may be an area called a UE specific search space or the like. A signal transmitted to the UE specific search space is monitored simultaneously from a single terminal, and thus the base station can transmit the DCI by a transmission beam formed toward the target terminal, for example.

Further, DCI that assigns different PDSCHs to the same terminal may include the indication of the number of HARQ-ACKs requested to be retransmitted. In this case, the base station may indicate, to the terminal, DCI including control information on the request for the retransmission of HARQ-ACK for the assigned PDSCH as well as a new PDSCH and resource assignment for HARQ-ACK for the new PDSCH, for example. The terminal may transmit, based on the DCI indicated from the base station, HARQ-ACK for the assigned PDSCH and HARQ-ACK for the new PDSCH in the resource assigned to HARQ-ACK for the new PDSCH, for example.

This eliminates the need for separately assigning the transmission resource to HARQ-ACK requested to be retransmitted by the base station in requesting the retransmission of HARQ-ACK, thereby improving the resource utilization efficiency.

Figure 14:
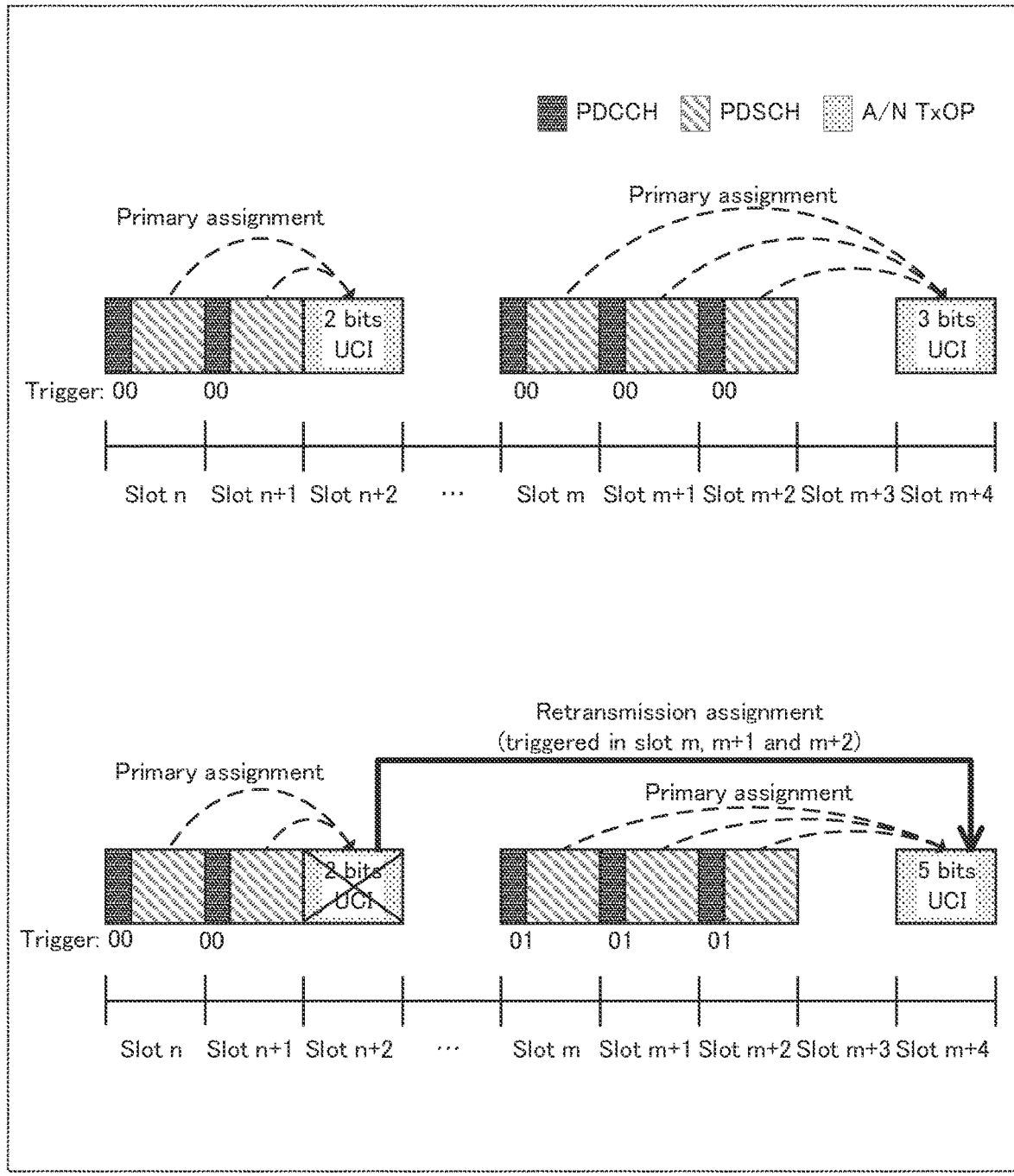
FIG. 14 illustrates an exemplary transmission method of the DCI according to Embodiment 3.

FIG. 14 illustrates an exemplary operation in a case of including the indication of the number of HARQ-ACKs requested to be retransmitted in the DCI assigning different PDSCHs to the same terminal. Note that the association illustrated in FIG. 13, for example, is used as the association between the indication bit (e.g., Trigger: 2 bits) indicated for the HARQ-ACK retransmission request and the number of HARQ-ACKs requested to be retransmitted in FIG. 14.

As illustrated in FIG. 14, HARQ-ACKs for PDSCH transmitted from the base station in slot n and slot n+1 are transmitted from the terminal in slot n+2, and HARQ-ACKs for PDSCH transmitted from the base station in slot m, slot m+1 and slot m+2 are transmitted from the terminal in slot m+4. This has been indicated from the base station to the terminal by PDCCH indicating the PDSCH assignment.

HARQ-ACKs are successfully transmitted in slot n+2 in the upper diagram in FIG. 14, and there is no HARQ-ACK requested to be retransmitted in slot m, slot m+1 and slot m+2. Thus, indication bit "00" for the HARQ-ACK retransmission request (i.e., no request for retransmission of HARQ-ACK) is indicated by the DCI in PDCCH in slot m, slot m+1 and slot m+2.

In the upper diagram in FIG. 14, HARQ-ACKs for PDSCH in slot n and slot n+1 is assigned to slot n+2, and a total of 2 bits of HARQ-ACKs are transmitted in slot n+2 accordingly.

In the lower diagram in FIG. 14, in contrast, the PUCCH transmission including HARQ-ACKs is failed in slot n+2. In order to request the retransmission of the HARQ-ACKs, the transmission of which is failed in slot n+2, the base station indicates indication bit "01" for the HARQ-ACK retransmission request (i.e., request for the retransmission of the two HARQ-ACKs) by the DCI in PDCCH in slot m, slot m+1 and slot m+2.

Thus, in the lower diagram in FIG. 14, the base station can assign the HARQ-ACKs for PDSCH assigned to slot m, slot m+1 and slot m+2 to a resource of slot m+4 for the terminal, and assign the HARQ-ACKs requested to be retransmitted (e.g., HARQ-ACKs for PDSCH assigned to slot n and slot n+1) to the resource of slot m+4.

As a result, in the lower diagram in FIG. 14, the HARQ-ACKs for PDSCH assigned to slot m, slot m+1 and slot m+2 and the HARQ-ACKs for PDSCH assigned to slot n and slot n+1 are assigned to slot m+4, and a total of 5 bits of HARQ-ACKs are transmitted in slot m+4 accordingly.

Note that, FIG. 14 illustrates the case where both the HARQ-ACKs for PDSCH assigned to slot m, slot m+1 and slot m+2 and the HARQ-ACKs for PDSCH assigned to slot n and slot n+1 are assigned to slot m+4, by way of example. The present embodiment is not limited to this, however, and the HARQ-ACKs for PDSCH assigned to slot n and slot n+1 (i.e., HARQ-ACKs requested to be retransmitted) may be assigned to a slot resource other than slot m+4, for example. The resource to be assigned to HARQ-ACKs requested to be retransmitted may be configured, for example, with reference to the resource (slot m+4 in FIG. 14) assigned for the transmission of HARQ-ACKs for the new PDSCH (PDSCH in slot m to slot m+3 in FIG. 14). For example, the resource to be assigned to HARQ-ACKs requested to be retransmitted may be configured to a slot immediately before the resource assigned for transmission of HARQ-ACKs for the new PDSCH (slot m+3 in FIG. 14). The base station and the terminal only need to have a common rule on the resource to which the HARQ-ACKs requested to be retransmitted are assigned, and determine the resource according to the rule.

Embodiment 4

In the present embodiment, descriptions will be given of resource assignment and a transmission timing of PUCCH used by a terminal (e.g., terminal 200 or terminal 400) to transmit HARQ-ACK requested to be retransmitted. Hereinafter, three Operation Examples 4-1 to 4-3 according to the present embodiment will be described.

Operation Example 4-1

In Operation Example 4-1, a base station (e.g., base station 100 or base station 300) shares a rule on a resource and a timing for transmitting HARQ-ACK requested to be retransmitted, and determines a transmission resource for the HARQ-ACK requested to be retransmitted according to the rule.

For example, the HARQ-ACK requested to be retransmitted may be retransmitted in the specified resource and timing.

For example, the timing of the resource (e.g., PUCCH resource) for the HARQ-ACK requested to be retransmitted may be a slot immediately after the slot where the DCI for HARQ-ACK retransmission request (i.e., DL control signal) is transmitted, or may be the first slot of a resource for a UL signal assigned after the slot where the DCI for HARQ-ACK retransmission request is transmitted. Alternatively, the timing of the resource for HARQ-ACK requested to be retransmitted may be one of states of PDSCH-to-HARQ-timing indicators configured by a higher layer.

This allows the base station and the terminal to determine the PUCCH resource used for transmitting and receiving HARQ-ACK requested to be retransmitted without an indication of the PUCCH resource.

Operation Example 4-2

In Operation Example 4-2, the base station indicates information on the PUCCH resource (e.g., resource and timing) for HARQ-ACK requested to be retransmitted to the terminal when requesting the retransmission of HARQ-ACK. The terminal retransmits HARQ-ACK on the indicated PUCCH resource.

For example, the terminal may determine the actual resource assignment for HARQ-ACK requested to be retransmitted from a configuration already configured by RRC supported in NR of Rel. 15, based on DCI that is indicated by the base station and includes information on the PUCCH resource for HARQ-ACK requested to be retransmitted.

In this case, the base station may reuse, for example, the information on the resource assignment for HARQ-ACK (e.g., PDSCH-to-HARQ_feedback timing indicator) included in DCI that assigns a PDSCH resource. The terminal may reuse a method of receiving the DCI that assigns a PDSCH resource for reception processing of the information on the resource assignment for HARQ-ACK. This simplifies retransmission processing of HARQ-ACK in the base station and the terminal.

Operation Example 4-3

In Operation Example 4-3, the base station and the terminal determine an assignment resource and a transmission timing of HARQ-ACK requested to be retransmitted based on the relation (i.e., common rule) between transmission timings of DCI requesting the retransmission of HARQ-ACK and DCI assigning a resource to another PDSCH.

Figure 15A:
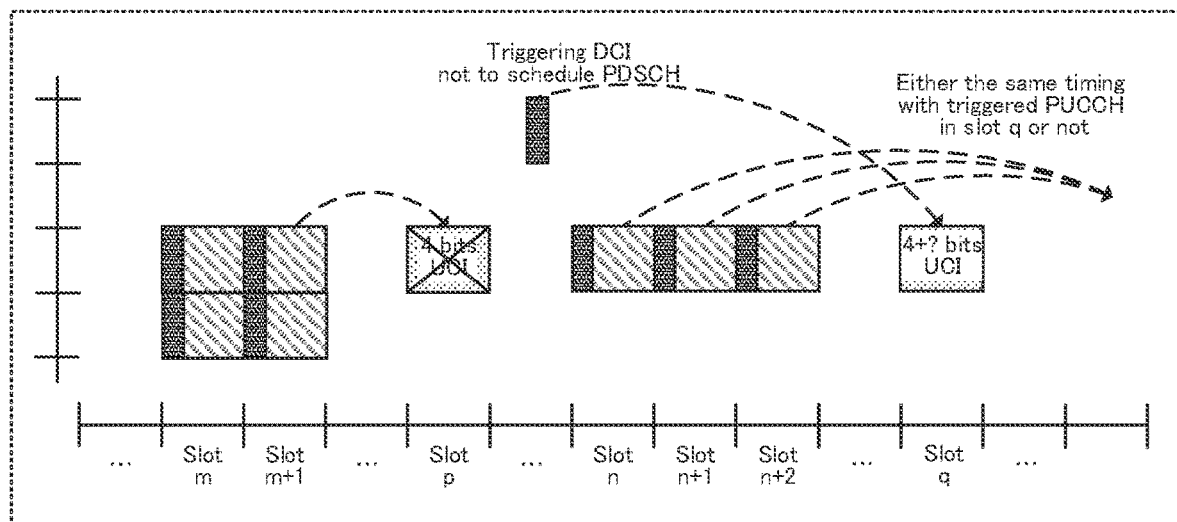
FIG. 15A illustrates an exemplary transmission method of DCI according to Embodiment 4.
Figure 15B:
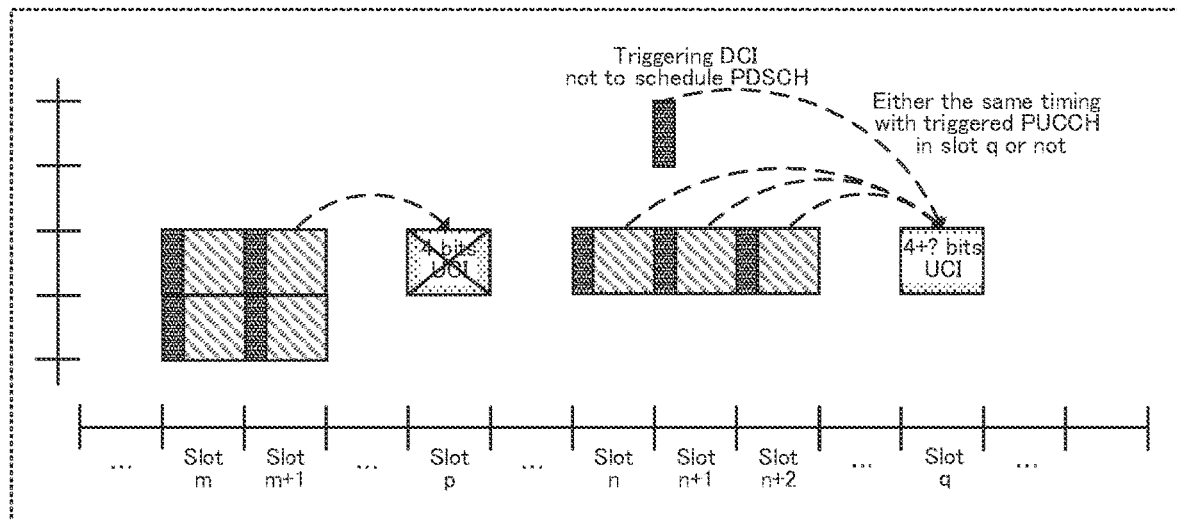
FIG. 15B illustrates another exemplary transmission method of the DCI according to Embodiment 4.
Figure 15C:
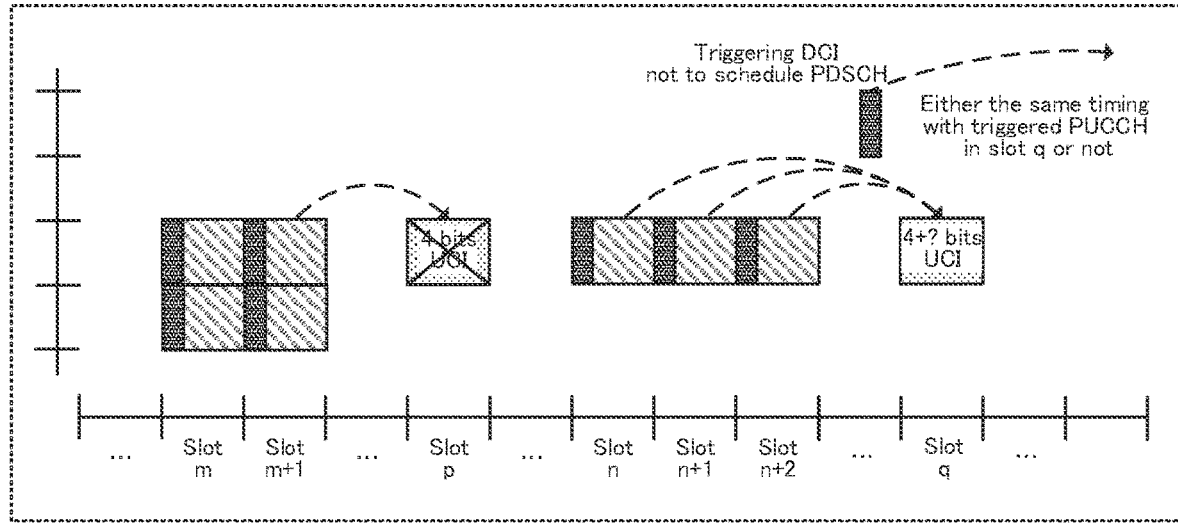
FIG. 15C illustrates still another exemplary transmission method of the DCI according to Embodiment 4.

FIGS. 15A, 15B and 15C illustrate exemplary transmissions of the DCI requesting the retransmission of HARQ-ACKs (Triggering DCI) and the DCI assigning a resource to another PDSCH.

FIGS. 15A, 15B and 15C illustrate a situation where HARQ-ACKs for PDSCH in slot m and slot m+1 are assigned to slot p but the HARQ-ACK transmission is failed.

FIG. 15A illustrates a case where DCI (e.g., Triggering DCI) requesting the retransmission of HARQ-ACKs failed to be transmitted in slot p is transmitted before slot n (i.e., before slot n, slot n+1 and slot n+2 where a new PDSCH is assigned).

In the case of FIG. 15A, the base station has not yet assigned HARQ-ACKs for PDSCH that is assigned to slot n to slot n+2 when requesting the retransmission of HARQ-ACKs. Then, the base station may assign, for example, the resource to the HARQ-ACKs requested to be retransmitted (e.g., HARQ-ACKs for PDSCH in slot n and slot n+1) independently of the resource assignment for the HARQ-ACKs for PDSCH in slot n to slot n+2. In FIG. 15A for example, the HARQ-ACKs requested to be retransmitted are assigned to slot q that is different from a resource (not illustrated) for the HARQ-ACKs for PDSCH in slot n to slot n+2.

At this time, a method supported in NR, for example, may be reused as the resource assignment method for the HARQ-ACKs. For example, when the HARQ-ACKs for PDSCH assigned to slot n to slot n+2 are assigned to slot q as well as the HARQ-ACKs requested to be retransmitted, the terminal may transmit both of the HARQ-ACKs in the same resource (e.g., slot q).

Next, FIG. 15B illustrates a case where DCI requesting the retransmission of HARQ-ACKs failed to be transmitted in slot p is transmitted between slot n and slot n+2 (i.e., during slot n, slot n+1 and slot n+2 where a new PDSCH is assigned).

In the case of FIG. 15B, the base station has started to assign HARQ-ACKs for the PDSCH assigned to slot n to slot n+2 at the time of requesting the retransmission of HARQ-ACKs. Then, the base station may assign, for example, the HARQ-ACKs requested to be retransmitted (e.g., HARQ-ACKs for PDSCH in slot n and slot n+1) to the same resource as the HARQ-ACKs for PDSCH in slot n to slot n+2.

In this case, the base station may either indicate or not indicate the resource assignment for the HARQ-ACKs requested to be retransmitted to the terminal. When the resource assignment is indicated for the HARQ-ACKs requested to be retransmitted, a method supported in NR, for example, may be reused as the resource assignment method for the HARQ-ACKs. Incidentally, the resource for the HARQ-ACKs requested to be retransmitted may be different from the resource for the HARQ-ACKs for PDSCH in slot n to slot n+2.

Subsequently, FIG. 15C illustrates a case where DCI requesting the retransmission of HARQ-ACK failed to be transmitted in slot p is transmitted in a slot after slots n to n+2 (i.e., after slot n, slot n+1 and slot n+2 where a new PDSCH is assigned).

In the case of FIG. 15C, the base station has started to assign HARQ-ACKs for the PDSCH assigned to slot n to slot n+2 at the time of requesting the retransmission of HARQ-ACKs.

In this case, the base station may assign, for example, the HARQ-ACKs requested to be retransmitted (e.g., HARQ-ACKs for PDSCH in slot n and slot n+1) to the same resource (not illustrated) as the HARQ-ACKs for PDSCH in slot n to slot n+2. The base station may either indicate or not indicate the resource assignment for the HARQ-ACKs requested to be retransmitted. When the resource assignment is indicated for the HARQ-ACKs requested to be retransmitted, a method supported in NR, for example, may be reused as the resource assignment method for the HARQ-ACKs.

Alternatively, the base station may configure so that the resource for the HARQ-ACKs requested to be retransmitted and the resource for the HARQ-ACKs for PDSCH in slot n and slot n+1 are different from each other, as illustrated in FIG. 15C.

As described above, Operation Example 4-3 allows the base station and the terminal to flexibly determine the resource used for the HARQ-ACKs requested to be retransmitted according to the relation (i.e., scheduling status) between the transmission timing of the DCI for HARQ-ACK retransmission request and the transmission timing of the DCI including the resource assignment information for another PDSCH.

Operation Examples 4-1 to 4-3 have been described, thus far.

Embodiment 5

In the present embodiment, descriptions will be given of a range of HARQ-ACKs the retransmission of which is requested by a base station (e.g., base station 100 or base station 300). In other words, descriptions will be given of a range of HARQ-ACKs to be buffered by a terminal (e.g., terminal 200 or terminal 400) in the present embodiment.

<Method 1>

In Method 1, HARQ-ACKs requested to be retransmitted are HARQ-ACKs that the base station has not received (i.e., HARQ-ACKs that the base station has failed to receive) among the HARQ-ACKs for a plurality of PDSCHs transmitted by the base station.

The terminal may hold HARQ-ACKs that have been failed to be transmitted although a resource to which has been assigned by the base station, until the base station successfully receives the HARQ-ACKs.

This allows the base station to, for example, request the retransmission of the HARQ-ACKs to the terminal until the base station successfully receives the HARQ-ACKs, without retransmitting PDSCH the HARQ-ACKs for which have not successfully been received.

<Method 2>

In Method 2, HARQ-ACKs requested to be retransmitted are HARQ-ACKs for some of a plurality of PDSCHs transmitted by the base station. In Method 2, some PDSCHs just mentioned are, for example, PDSCHs transmitted by the base station between COT (i.e., transmittable period) configured at the current time and COT immediately before the current COT, among a plurality of COTs.

For HARQ-ACKs that have been failed to be transmitted although a resource to which has been assigned by the base station, the terminal may hold HARQ-ACKs for PDSCHs transmitted in the COT configured at that time and the COT immediately before the current COT, and discard HARQ-ACKs for PDSCHs transmitted in COTs prior to the current COT by two or more.

In this case, for the PDSCHs transmitted in the COTs prior to the current COT by two or more, for example, the base station may retransmit the PDSCHs that are unknown whether the terminal has successfully received, without requesting the retransmission of HARQ-ACKs corresponding to the transmitted PDSCHs.

This reduces the memory for buffering HARQ-ACKs in the terminal, for example.

<Method 3>

In Method 3, HARQ-ACKs requested to be retransmitted are HARQ-ACKs for some of a plurality of PDSCHs transmitted by the base station. In Method 3, some PDSCHs just mentioned are, for example, PDSCHs transmitted by the base station between COT (i.e., transmittable period) configured at the current time and COT prior to the current COT by a specified number (e.g., X), among a plurality of COTs.

For HARQ-ACKs that have been failed to be transmitted although a resource to which has been assigned by the base station, the terminal may hold HARQ-ACKs for PDSCHs transmitted from the COT configured at that time to the COT prior to the current COT by X, and discard HARQ-ACKs for PDSCHs transmitted in COTs prior to the current COT by (X+1) or more.

In this case, for the PDSCHs transmitted in the COTs prior to the current COT by (X+1) or more, for example, the base station may retransmit the PDSCHs that are unknown whether the terminal has successfully received, without requesting the retransmission of HARQ-ACKs corresponding to the transmitted PDSCHs.

This reduces the memory for buffering HARQ-ACKs in the terminal, for example.

Note that the value of X may be configured in advance, or may be variably configured by a higher layer or DCI. When the value of X is variably configured by a higher layer, the configuration value may be indicated from the base station to the terminal. For example, the case where X=1 is the same as in Method 2.

<Method 4>

In Method 4, HARQ-ACKs requested to be retransmitted are HARQ-ACKs for some of a plurality of PDSCHs transmitted by the base station. In Method 4, some PDSCHs just mentioned are, for example, PDSCHs transmitted by the base station, between the current slot and a slot prior to the current slot by a specified number (e.g., X).

For HARQ-ACKs that have been failed to be transmitted although a resource to which has been assigned by the base station, the terminal may hold HARQ-ACKs for PDSCHs transmitted within X slots from the moment, and discard HARQ-ACKs for PDSCHs transmitted in slots prior to the current slot by (X+1) or more.

In this case, for the PDSCHs transmitted in the slots prior to the current slot by (X+1) or more, for example, the base station may retransmit the PDSCHs that are unknown whether the terminal has successfully received, without requesting the retransmission of HARQ-ACKs corresponding to the transmitted PDSCHs.

Note that the value of X may be configured in advance, or may be variably configured by a higher layer or DCI. When the value of X is variably configured by a higher layer, the configuration value may be indicated from the base station to the terminal.

This reduces the memory for buffering HARQ-ACKs in the terminal, for example.

Herein, the slot length is changed, for example, according to subcarrier spacing (SCS) whereas the COT length is configured, for example, with respect to the absolute time. Although the slot length is changed as the SCS is changed, the memory required for buffering HARQ-ACKs in the terminal can be kept constant by the number of slots based on the value of X, according to Method 4.

Embodiment 6

In the present embodiment, a description will be given of a case of grouping a plurality of PDSCHs.

When requesting the retransmission of HARQ-ACKs, for example, the base station may indicate, to the terminal, information (e.g., group ID) for identifying a group including PDSCHs corresponding to the HARQ-ACKs requested to be retransmitted.

For example, the base station may indicate, to the terminal, the number of HARQ-ACKs requested to be retransmitted and the group ID corresponding to the HARQ-ACKs requested to be retransmitted. The terminal may select the HARQ-ACKs for the number of HARQ-ACKs requested to be retransmitted in a group of the group number corresponding to the HARQ-ACKs requested to be retransmitted, and retransmit the selected HARQ-ACKs.

For example, PDSCHs may be grouped based on whether the PDSCHs are assigned in COT configured at the time of the HARQ-ACK request, as a reference of PDSCH grouping. The base station may, for example, request the retransmission of HARQ-ACKs corresponding to a PDSCH group included in COT other than the COT configured at the time of requesting the retransmission of the HARQ-ACKs. For the HARQ-ACKs corresponding to a PDSCH group included in the COT configured at the time of the HARQ-ACK request, the base station may request the retransmission after the COT is completed and another COT is configured.

The above-described rule on the group of PDSCHs corresponding to HARQ-ACKs requested to be retransmitted may be shared between the base station and the terminal. This enables the terminal to determine the retransmission of HARQ-ACKs corresponding to the PDSCH group included in the COT other than the COT configured at the current time, for example, without an indication of the information on the group from the base station.

Further, PDSCHs may be grouped for each of the configured COTs, for example, as another reference of the PDSCH grouping. In this case, the base station may indicate, for example, along with a request for HARQ-ACK retransmission, information (or group ID) indicating the temporal location of the COT (i.e., group) including the PDSCHs corresponding to the requested HARQ-ACKs with respect to the COT configured at the time of the request.

This enables the terminal to determine the HARQ-ACKs requested by the base station to be retransmitted based on the indicated group ID.

Furthermore, for example, the base station may add an identification bit, such as a group ID, corresponding to PDSCHs to DCI indicating the resource assignment for the PDSCHs. In this case, the base station may indicate, to the terminal, the group identification bit of the PDSCHs corresponding to HARQ-ACKs requested to be retransmitted when requesting the retransmission of the HARQ-ACKs. In addition, the terminal may select the HARQ-ACKs requested to be retransmitted based on the group identification bit indicated with the HARQ-ACK retransmission request, and retransmit the selected HARQ-ACKs to the base station.

Other Embodiments

Each of the above Embodiments 3 to 6 may be combined with either Embodiment 1 or Embodiment 2. Also, a plurality of the embodiments among Embodiments 3 to 6 may be combined with either Embodiment 1 or Embodiment 2.

In addition, although each of the above embodiments has described the example where the terminal fails to secure a transmission opportunity (or transmission right) by LBT and fails to transmit HARQ-ACK, cases where the base station requests retransmission of HARQ-ACK also include, for example, a case where the terminal has transmitted HARQ-ACK but the reception quality at the base station is poor. The terminal only needs to retransmit the HARQ-ACK that has been transmitted, according to an indication from the base station.

Further, each of the above embodiments has described the operation in the unlicensed band, but the present disclosure is not limited to this, and an embodiment of the present disclosure may be applied to a band shared by a plurality of businesses, which is called a "shared band", for example. An embodiment of the present disclosure may also be applied to a situation where the line quality is poor and retransmission of HARQ-ACK is required in a band other than the unlicensed band.

For example, when the unlicensed band and the licensed band are operated with carrier aggregation, the base station may indicate the HARQ-ACK retransmission request from the licensed band.

The above embodiments have described the case of using PDCCH as a downlink control channel for transmitting a control signal. However, a control channel of another name may be used as the downlink control channel for transmitting a control signal. For example, the downlink control channel for transmitting a control signal may include an Enhanced PDCCH (EPDCCH), a Relay PDCCH (R-PDCCH), a Machine Type Communication PDCCH (MPDCCH), etc. Additionally, a downlink data channel for transmitting DL data is not limited to PDSCH, and may be a data channel of another name. Likewise, an uplink data channel or uplink control channel for transmitting a UL signal (e.g., UL data or HARQ-ACK) is not limited to PUSCH and PUCCH, and may be a channel of another name.

In the above embodiments, the higher layer signaling is assumed to be RRC signaling, but may be replaced with Medium Access Control (MAC) signaling and an indication by DCI, which is physical layer signaling. The MAC signaling and the physical layer signaling increase frequency of the change compared to the RRC signaling.

Although the above embodiments have described the case where the transmission timing of HARQ-ACK is configured in units of slots, the transmission timing of HARQ-ACK may be configured in units of time resources other than the slots (e.g., subframes, frames, mini slots, etc.).

Further, the above embodiments have described the case where the base station request, to the terminal, retransmission of HARQ-ACK failed to be transmitted although a resource to which has been assigned (i.e., the second and subsequent HARQ-ACK transmissions). An embodiment of the present disclosure, however, is not limited to be applied to the second and subsequent HARQ-ACK transmission assignments. The operation in requesting the retransmission of HARQ-ACK according to an embodiment of the present disclosure may be applied to, for example, the X-th and subsequent retransmission requests. The value of X may be variably configured to the terminal. Note that a rule for applying an embodiment of the present disclosure to the X-th and subsequent retransmission requests is shared between the base station and the terminal. In this case, the value of X may be, for example, indicated from the base station to the terminal by a higher layer, or may be indicated from the base station to the terminal by DCI.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A base station according to an embodiment of the present disclosure includes: a transmitter, which in operation, transmits control information on a request for retransmission of a response signal for downlink data; and a receiver, which in operation, receives the response signal retransmitted based on the control information, wherein the control information is information for identifying one of a plurality of candidate values for the number of a plurality of the response signals requested to be retransmitted, and the plurality of candidate values are configured based on one of a plurality of granularities.

In an embodiment of the present disclosure, the one of the plurality of granularities is determined based on at least one of the number of carrier aggregations and/or the number of processes for retransmission control.

In an embodiment of the present disclosure, information on the one of the plurality of granularities is indicated to a terminal apparatus by higher layer signaling.

In an embodiment of the present disclosure, the control information indicates a value based on a remainder resulting from dividing the number of the response signals requested to be retransmitted by a maximum value of the candidate values when the number of the response signals requested to be retransmitted is greater than the maximum value of the candidate values.

In an embodiment of the present disclosure, the candidate values are each a value indicating a total number of the downlink data transmitted to a terminal apparatus.

In an embodiment of the present disclosure, the candidate values are each a value based on a remainder resulting from dividing, by a specified value, a total number of the downlink data transmitted to a terminal apparatus.

In an embodiment of the present disclosure, the transmitter transmits a downlink control signal including the control information but not including resource assignment information for the downlink data.

In an embodiment of the present disclosure, the transmitter transmits the downlink control signal in a terminal-specific space.

In an embodiment of the present disclosure, the transmitter transmits a downlink control signal including the control information and resource assignment information for the downlink data.

In an embodiment of the present disclosure, the receiver receives the response signal retransmitted in a specified resource.

In an embodiment of the present disclosure, the transmitter transmits information on an uplink resource for the response signal requested to be retransmitted, and the receiver receives the response signal retransmitted in the uplink resource.

In an embodiment of the present disclosure, the receiver receives the response signal retransmitted in an uplink resource determined based on a relation between a transmission timing of the control information and a transmission timing of a signal including resource assignment information for other downlink data.

In an embodiment of the present disclosure, the response signal requested to be retransmitted is the response signal that the base station has not received among the plurality of response signals for a plurality of the downlink data transmitted by the base station.

In an embodiment of the present disclosure, the response signal requested to be retransmitted is the response signal for some of a plurality of the downlink data transmitted by the base station.

In an embodiment of the present disclosure, the some of a plurality of the downlink data are the downlink data transmitted by the base station between a transmittable period configured at current time and a transmittable period prior to the transmittable period configured at current time by a specified number, among a plurality of the transmittable periods.

In an embodiment of the present disclosure, the some of a plurality of the downlink data are the downlink data transmitted by the base station between a time resource at current time and a time resource prior to the time resource at current time by a specified number.

In an embodiment of the present disclosure, a plurality of the downlink data transmitted from the base station are grouped into a plurality of groups respectively for transmittable periods in which the plurality of downlink data have been transmitted, and the response signal requested to be retransmitted is the response signal for the downlink data included in any of the plurality of groups.

In an embodiment of the present disclosure, the response signal requested to be retransmitted is the response signal for the downlink data included in at least one of the plurality of groups corresponding to at least one of the transmittable periods other than the transmittable period configured at current time.

In an embodiment of the present disclosure, the transmitter transmits information for identifying at least one of the plurality of groups including the downlink data corresponding to the response signal requested to be retransmitted.

A terminal according to an embodiment of the present disclosure includes: a receiver, which in operation, receives control information on a request for retransmission of a response signal for downlink data; and a transmitter, which in operation, transmits the response signal based on the control information, wherein, the control information is information for identifying one of a plurality of candidate values for the number of a plurality of the response signals requested to be retransmitted, and the plurality of candidate values are configured based on one of a plurality of granularities.

A communication method according to an embodiment of the present disclosure includes: transmitting control information on a request for retransmission of a response signal for downlink data by a base station; and receiving the response signal retransmitted based on the control information by the base station, wherein, the control information is information for identifying one of a plurality of candidate values for the number of a plurality of the response signals requested to be retransmitted, and the plurality of candidate values are configured based on one of a plurality of granularities.

A communication method according to an embodiment of the present disclosure includes: receiving control information on a request for retransmission of a response signal for downlink data by a terminal apparatus; and transmitting the response signal based on the control information by the terminal apparatus, wherein, the control information is information for identifying one of a plurality of candidate values for the number of a plurality of the response signals requested to be retransmitted, and the plurality of candidate values are configured based on one of a plurality of granularities.

The disclosure of Japanese Patent Application No. 2019-059206, filed on Mar. 26, 2019, including the specification, drawings and abstract, is incorporated herein by reference in its entirety.

INDUSTRIAL APPLICABILITY

An exemplary embodiment of the present disclosure is useful for mobile communication systems.

REFERENCE SIGNS LIST 100, 300 Base station
101, 302 DCI generator
102 PDSCH number storage
103, 206 Indication number determiner
104, 208 Error correction encoder
105, 209 Modulator
106, 211 Signal assigner
107, 212 Transmission section
108, 201 Reception section
109, 202 Signal separator
110, 204 Demodulator
111, 205 Error correction decoder
112, 210 Carrier sensor
113 HARQ-ACK receiver
200, 400 Terminal
203 DCI receiver
207, 401 HARQ-ACK buffer
301 Total DAI value buffer

The invention claimed is:

1. A terminal apparatus comprising:
a receiver which, in operation, receives, from a base station, a downlink assignment index (DAI) that is transmitted by means of a downlink control information (DCI) format, the DAI indicating an accumulative number of a transmitted physical downlink shared channel (PDSCH) included in a group of PDSCHs, wherein a range of the accumulative number of which the DAI is indicative is variably configured; and
a transmitter which, in operation, transmits, to the base station, hybrid automatic repeat request acknowledgement (HARQ-ACK) information based on the DAI, wherein
the range of the accumulative number is indicated by information for identifying one or a plurality of granularities, and
the one of the granularity is indicated by carrier aggregations or a number of processes for retransmission control.

2. The terminal apparatus according to claim 1, wherein the DCI format includes information to identify a group of PDSCH from a plurality of groups of PDSCHs.

3. The terminal apparatus according to claim 1, wherein a value of the DAI is determined using modulo arithmetic with a defined value selected from a plurality of defined values.

4. The terminal apparatus according to claim 1, wherein a time domain resource assignment is included in the DCI format, and the time domain resource assignment is associated with the group of PDSCHs.

5. A communication method comprising:
receiving, from a base station, a downlink assignment index (DAI) that is transmitted by means of a downlink control information (DCI) format, the DAI indicating an accumulative number of a transmitted physical downlink shared channels (PDSCH) included in a group of PDSCHs, wherein a range of the accumulative number of which the DAI is indicative is variably configured; and
transmitting, to the base station, hybrid automatic repeat request acknowledgement (HARQ-ACK) information based on the DAI, wherein
the range of the accumulative number is indicated by information for identifying one or a plurality of granularities, and
the one of the granularity is indicated by carrier aggregations or a number of processes for retransmission control.

* * * * *